US012403347B2

(12) United States Patent
Goyette et al.

(10) Patent No.: US 12,403,347 B2
(45) Date of Patent: Sep. 2, 2025

(54) SYSTEMS AND METHODS OF MONITORING TEMPERATURE IN A FIRE SUPPRESSION SYSTEM

(71) Applicant: Tyco Fire Products LP, Cranston, RI (US)

(72) Inventors: Chad A. Goyette, Tiverton, RI (US); Jeremy Tyler Cogswell, Johnston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/397,563

(22) Filed: Dec. 27, 2023

(65) Prior Publication Data
US 2024/0165445 A1 May 23, 2024

Related U.S. Application Data

(63) Continuation of application No. 16/254,027, filed on Jan. 22, 2019, now Pat. No. 11,878,196.
(Continued)

(51) Int. Cl.
*A62C 37/50* (2006.01)
*A62C 3/00* (2006.01)
(Continued)

(52) U.S. Cl.
CPC .............. *A62C 37/50* (2013.01); *A62C 3/004* (2013.01); *A62C 35/62* (2013.01); *A62C 35/68* (2013.01); *A62C 37/04* (2013.01)

(58) Field of Classification Search
CPC ......... A62C 37/50; A62C 37/04; A62C 37/36; A62C 2/24; A62C 99/009; A62C 35/68; A62C 35/62; A62C 3/004
See application file for complete search history.

(56) References Cited

U.S. PATENT DOCUMENTS

| 2006/0272830 | A1 | 12/2006 | Fima |
| 2014/0332240 | A1 | 11/2014 | Kochelek et al. |
| 2017/0100617 | A1* | 4/2017 | Kochelek ............... A62C 37/50 |

FOREIGN PATENT DOCUMENTS

| EP | 2759823 A2 * | 7/2014 | ............. A62C 13/76 |
| KR | 20160135030 A | 11/2016 | |
| WO | WO-2015/134914 A1 | 9/2015 | |

OTHER PUBLICATIONS

International Search Report and Written Opinion for International Application No. PCT/US2019/014549, dated Mar. 27, 2019, 12 pages.

* cited by examiner

*Primary Examiner* — Christopher R Dandridge
(74) *Attorney, Agent, or Firm* — Foley & Lardner LLP

(57) ABSTRACT

A temperature monitoring apparatus includes a temperature sensor and a control circuit. The temperature sensor detects a temperature of a piping system, such as a temperature of water in the piping system. The control circuit includes one or more processors and a memory storing instructions that, when executed by the one or more processors, cause the control circuit to determine whether water in the piping system is expected to freeze based on the indication of the temperature, predict whether a valve tripping event is expected to occur based on determining that the water in the piping system is expected to freeze, and in response to predicting that the valve tripping event is expected to occur, provide a prediction that the valve tripping event is expected to occur for remedial action.

14 Claims, 15 Drawing Sheets

Related U.S. Application Data

(60) Provisional application No. 62/620,684, filed on Jan. 23, 2018.

(51) Int. Cl.
*A62C 35/62* (2006.01)
*A62C 35/68* (2006.01)
*A62C 37/36* (2006.01)

SYSTEMS AND METHODS OF MONITORING TEMPERATURE IN A FIRE SUPPRESSION SYSTEM

CROSS-REFERENCE TO RELATED APPLICATIONS

The present disclosure is a continuation of U.S. patent application Ser. No. 16/254,027, filed Jan. 22, 2019, which claims the benefit of and priority to U.S. Provisional Application No. 62/620,684, titled "DEVICE AND METHOD FOR MONITORING TEMPERATURE IN A FIRE SUPPRESSION SYSTEM," filed Jan. 23, 2018, the disclosures of which are incorporated herein by reference in their entireties.

BACKGROUND

An automatic sprinkler system has sprinklers that are activated once the ambient temperature in an environment, such as a room or a building, exceeds a predetermined value. Once activated, the sprinklers distribute fire-extinguishing fluid, such as water, in the room or building.

SUMMARY

Various aspects relate to systems and methods of remote monitoring of fire suppression systems, such as to prevent or mitigate false trips in fire suppression systems. Process and corrosion data of a fire suppression system and be measured and calculated, and transmitted to a central location where the data is processed for diagnostics purposes. The data can be gathered by at least one edge device which is installed on the fire suppression system in multiple locations to capture the process and/or corrosion data.

At least one aspect relates to an edge device that includes a temperature monitoring apparatus to mitigate false trips of a valve that supplies water to a fire suppression system. The temperature monitoring apparatus can include a temperature sensor to sense a temperature of a piping system of the fire suppression system. The temperature monitoring device can include a control circuit that determines whether water in the piping system can freeze based on the temperature information and predicts a valve tripping event can occur based on a determination that the water in the piping system can freeze. In response to a prediction that the valve tripping event can occur, the control circuit can provide the prediction that the valve tripping event can occur for remedial action. The remedial action can include automatically draining the water from the piping system.

In some embodiments, the temperature monitoring apparatus includes an ambient temperature sensor disposed so as to measure an ambient temperature surrounding the piping system. The control circuit can determine the water can freeze if the temperature of the water is less than a predetermined value and the ambient temperature is less than the temperature of the water. In some embodiments, the control circuit determines the water can freeze if the ambient temperature is less than a freeze point of the water in the piping system. The temperature sensor can be disposed on an outside surface of a pipe. The temperature sensor can be disposed inside a pipe. In some embodiments, the temperature sensor is disposed in a low point of the piping system. The temperature sensor can be disposed in a horizontal run of the piping system. In some embodiments, the temperature sensor is disposed at an inlet of the valve.

At least one aspect relates to a temperature monitoring apparatus that includes a temperature sensor and a control circuit. The temperature sensor detects a temperature of a piping system, such as a temperature of water in the piping system. The control circuit includes one or more processors and a memory storing instructions that, when executed by the one or more processors, cause the control circuit to determine whether water in the piping system is expected to freeze based on the indication of the temperature, predict whether a valve tripping event is expected to occur based on determining that the water in the piping system is expected to freeze, and in response to predicting that the valve tripping event is expected to occur, provide a prediction that the valve tripping event is expected to occur for remedial action.

At least one aspect relates to a method of mitigating false trips of a valve supplying water to a fire suppression system. The method includes predicting a valve tripping event can occur based on a determination that water in a piping system of the fire suppression system can freeze, and in response to a prediction that the valve tripping event can occur, providing the prediction that the valve tripping event can occur for remedial action. The method can include performing the remedial action by automatically draining the water from the piping system. A determination that the water can freeze can be made if the temperature of the water is less than a predetermined value and an ambient temperature is less than the temperature of the water. The temperature can be measured in a horizontal run of the piping system. The temperature sensor can be disposed in a low point of the piping system.

At least one aspect relates to a method of mitigating false trips of a valve supplying water to a fire suppression system. The method includes detecting, by a temperature sensor, a temperature of a piping system of the fire suppression system, determining whether water in the piping system is expected to freeze based on the temperature, predicting whether a valve tripping event is expected to occur based on determining that water in the piping system is expected to freeze; and in response to predicting that the valve tripping event is expected occur, providing a prediction that the valve tripping event is expected to occur for remedial action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
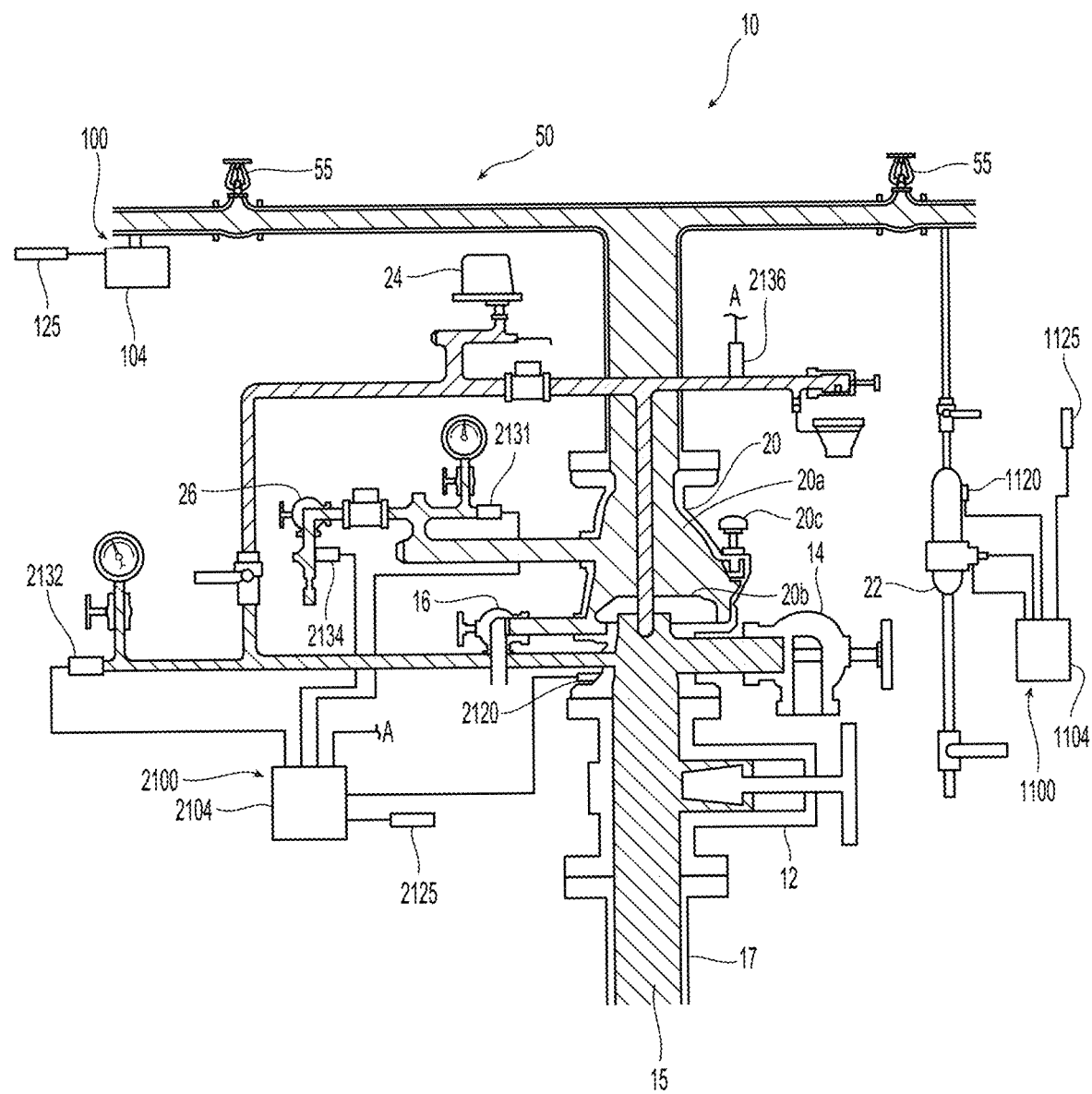
FIG. 1 is schematic system diagram of a fire protection system in an unactuated ready state with edge devices.
Figure 2A:
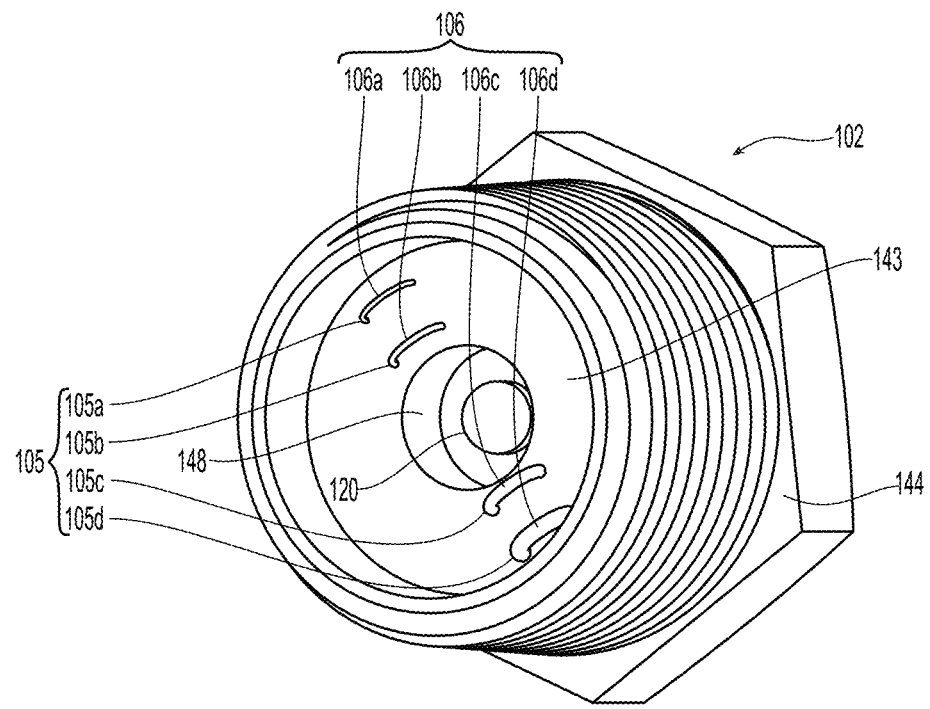
FIG. 2A is a perspective view of a corrosion monitoring sensor assembly.
Figure 2B:
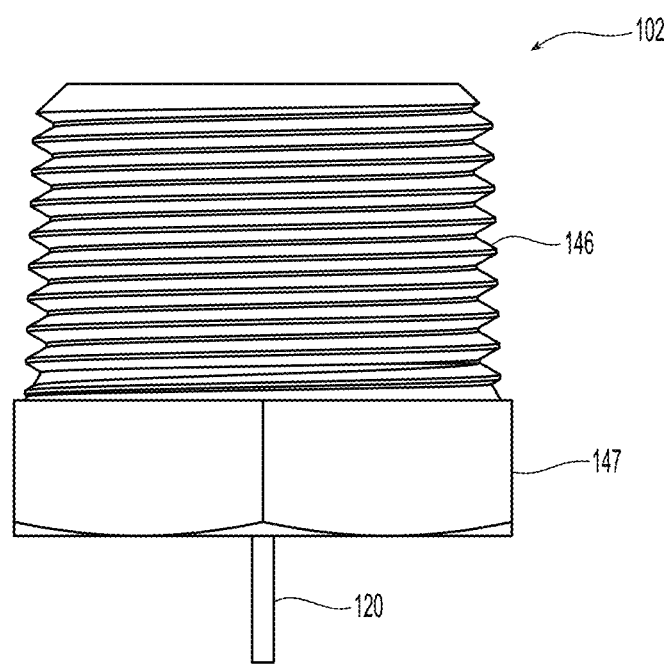
FIG. 2B is a side view of a corrosion monitoring sensor assembly.
Figure 2C:
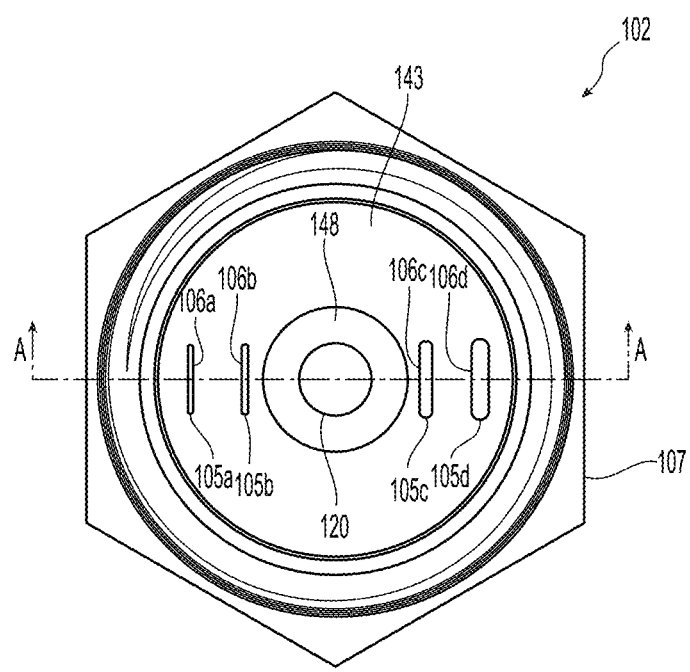
FIG. 2C is a top view of a corrosion monitoring sensor assembly.
Figure 2D:
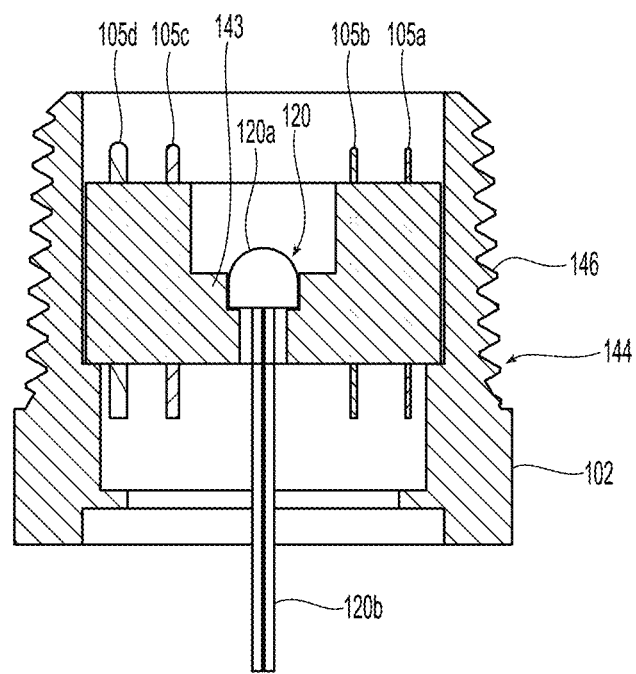
FIG. 2D is a side cross-sectional view of a corrosion monitoring sensor assembly.

The present disclosure generally relates to monitoring and controlling a fire suppression system. More particularly, the present disclosure relates to systems and methods of preventing or mitigating false trips of a fire sprinkler system.

A fire sprinkler system, depending on its specified configuration, is considered effective if it controls or suppresses a fire. The sprinkler system can be provided with a water supply (e.g., a reservoir or a municipal water supply). Such supply may be separate from that used by a fire department. Regardless of the type of supply, the sprinkler system is provided with a main that enters the building to supply a riser. Connected at the riser are valves, meters, and, for example, an alarm to sound when the system activates. Downstream of the riser, a usually horizontally disposed array of pipes extends throughout the fire compartment in the building. Other risers may feed distribution networks to systems in adjacent fire compartments. The sprinkler system can be provided in various configurations. In a wet-pipe system, used for example, in buildings having heated spaces for piping branch lines, all the system pipes contain a fire-fighting liquid, such as, water for immediate release through any sprinkler that is activated. In a dry-pipe system, used in for example, unheated areas, areas exposed to freezing, or areas where water leakage or unintended water discharge is normally undesirable or unacceptable such as, for example, a residential occupancy, the pipes, risers, and feed mains, branch lines and other distribution pipes of the fire protection system may contain a dry gas (air or nitrogen or mixtures thereof) under pressure when the system is in a stand-by or unactuated condition. A valve is used to separate the pipes that contain the water from the portions of the system that contain the dry gas. When heat from a fire activates a sprinkler, the gas escapes from the branch lines and the dry-pipe valve trips or actuates; water enters branch lines; and firefighting begins as the sprinkler distributes the water.

Dry-pipe systems have differential dry pipe fire protection valves that require a minimum pressure differential of air to water to remain closed. For example, some dry-pipe fire protection valves require a water pressure to air pressure ratio of 5.5 to maintain the valve in a closed position. However, in a typical system, water pressure fluctuations can only be estimated which can make it difficult to accurately specify a minimum required air pressure. Typically, a low air pressure alarm device is used to monitor air pressure in the system and the alarm device is set at a fixed pressure threshold derived from a table. The low threshold pressure setting typically includes a safety factor to account for pressure fluctuations in the fire system. The low air pressure alarm device activates when the system air pressure drops below the low pressure threshold, which is manually set at the time of installation of the fire suppression system. Because the system air pressure keeps the fire protection valve closed, the alarm alerts an operator that the fire suppression system could trip if the reason for the low air pressure is not addressed.

A drawback of this method is that inadvertent dry pipe valve operation, i.e., false trips, has been observed without the indication of low air pressure in the system and/or a rapid drop in air pressure that is unrelated to a fire. Such false trips of the fire suppression system can occur because water pressure fluctuations on the upstream side of the fire protection valve can vary greatly from one system to another and from one day to another. It is possible for the water pressure to fluctuate outside of the estimated range leading to a situation where the system air pressure is not adequate to keep the valve closed, but the operator is also not alerted of this situation with a low air alarm.

In addition, false trips can occur in dry-type fire suppression systems due to leaks in the fire sprinkler piping that rapidly drop the air pressure before corrective action can be taken. Air leaks can occur when a pipe or valve ruptures due to water freezing or when a pipe wall has corroded to a point that it cannot hold the air pressure. Currently, fire suppression system problems are typically dealt with in a reactive way. That is, corrective action is taken only after a system failure or a false trip occurs and there is a lack of information concerning the events leading to the system failure or false trip. Related art systems lack the capability to provide information for on-line diagnostics of fire system parameters to analyze system failures or false trips that have occurred and to prevent or mitigate future system failures and false trips of the fire suppression system.

Systems and methods of the present disclosure can prevent or mitigate false trips in fire suppression systems. Systems and methods of the present disclosure can measure and calculate process and corrosion data of a fire suppression system, and transmit the data to a central location where the data is processed for diagnostics purposes. The data can be measured by at least one "edge device" which is installed on the fire suppression system in multiple locations to capture the process and/or corrosion data. "Edge device" as used herein means a data gathering instrument or other device disposed on-site, e.g., disposed in the building housing the fire suppression system as opposed to a data gathering device on a cloud or a backend server. The edge device can be a corrosion monitoring device, a low point monitoring device, a valve pressure monitoring device, or any combination thereof.

FIG. 1 depicts a dry pipe fire protection sprinkler system 10 equipped with a differential-type dry pipe valve 20. A dry pipe fire protection sprinkler system 10 can protect a warehouse or other structure located in a geographical region that can be subject to temperatures below freezing and having unheated areas that must be protected against fire. The system 10 includes a dry pipe valve 20 with an outlet that is connected to a piping system 50. The piping system 50 includes spaced fire sprinkler heads 55 extending throughout piping system 50 to protect the warehouse or other structure. The dry pipe valve 20 can be located within an enclosure that is heated to protect against freezing. Because the piping system 50 can be filled with air or other gas, e.g., nitrogen, the piping system 50 can be disposed in unheated areas of the warehouse or structure. Air or other gases, such as nitrogen, can be used as the gas. Water or other types of fire suppressant, such as chemical suppressant, can be used as the fire suppressant. Systems and methods described herein can be applied to wet pipe systems.

The inlet of the dry pipe valve 20 can be connected to a reliable external source of water 15, e.g. a city main through a fire main. As depicted in FIG. 1, the water from the external water source 15 is sent to a riser 17 that is connected to a main control valve 12, which is opened to provide water to the inlet of the dry pipe valve 20. The system in FIG. 1 is depicted in the ready state. In the presence of a fire, one or more of the sprinklers 55 will open automatically in response to the local fire temperature. The open sprinkler will result in a reduction of air pressure within the piping system 50 (and within the air-side chamber 20a of the dry pipe valve 20). The loss of air pressure will open the clapper 20b of the dry pipe valve 20 to permit water to flow through the piping system 50 and out the open sprinkler(s) 55. As the piping system 50 fills with water, a water motor alarm (not shown) and/or a water pressure alarm 24 provides an external notice that the fire suppression system has been activated. Once the fire has been extinguished, water flow to the piping system 50 is discontinued by closing the main control valve 12. Once the flow of water from the source 15 is stopped, the piping system 50 can be drained by opening the main drain valve 14 and the lower body drain valve 16. During this time, the clapper 20b is latched open so that the system can be drained. Once drained, the clapper 20b is allowed to return to its closed position by depressing the reset knob 20c. After any open sprinkler has been replaced, the piping system 50 is recharged with air or another gas, e.g., nitrogen, through valve 26. Once charged, water flow to the inlet of the dry pipe valve 20 is restored by opening the main control valve 12 and thereby placing the fire suppression system back in a ready state.

During the ready state, to maintain the clapper 20b in a closed position against the water supply pressure from water source 15, the discharge side of the dry pipe valve 20 can be pressurized with air such that a ratio of the water pressure to the air pressure satisfies a predetermined ratio value, which will be dependent on the design of the dry pipe valve. For example, the ratio between the water pressure and the air pressure can be in a range of 4 to 7, such as 5.5. By setting the ratio between the water pressure and the air pressure at the predetermined value, the clapper 20b of the dry pipe valve 20 can maintain a seal around the seat of the dry pipe valve 20 and prevent water from entering the piping system 50. Fire suppression systems can have a water pressure value that is in a range of 55 to 330 psi, which means that the air pressure should have a value in a range of 10 to 60 psi. As an added safety factor to account for fluctuations in the air and water pressures, the air pressure can be further increased by an offset, e.g., 5-15 psi, beyond that needed to maintain the predetermined ratio value. In order ensure the fire suppression system activates in a timely manner to minimize the damage due to the fire, the additional offset may be kept as low as possible.

As discussed above, in dry type fire suppression systems, when operating as designed, a break in a sprinkler 55 due to a fire can result in a drop of air pressure in the piping system 50 and cause the clapper 20b to operate and send water out the broken sprinkler via the piping system 50. However, it is not uncommon for the fire suppression system to be activated inadvertently, e.g., a false trip. This is because there can be reasons other than a broken sprinkler for the air pressure in the piping system 50 to drop to a point where the clapper 20b operates in dry type systems or for water pressure on the sprinkle side to drop in wet type systems. For example, in dry type systems, frozen water in the pipes can crack or break the pipe and create an air leak, the pipe walls can corrode to a point where an air leak occurs, and/or the water pressure can fluctuate and increase to a point where the air pressure is not enough to keep the clapper 20b closed. Similarly, in wet type systems (not shown), frozen water in the pipes can crack or break the pipe and create water leak and/or the pipe walls can corrode to a point where water leak occurs, which can create situations in which a false trip occurs. A false trip on the fire suppression system in either wet type or dry type can be very costly. For example, there can be damage to equipment and property due to water leaking from the cracks or breaks in the piping and there are the additional costs associated with the repairs. However, even if the false trip did not initially occur due to a break in the piping (e.g., due to a fluctuation in the water pressure), there can still be significant damage if the ambient temperature is below freezing and the false trip results in a total system freeze up.

Edge devices can be installed in various locations of the piping system 50 to monitor for conditions that can lead to false trips. As seen in FIG. 1, an edge device can be a corrosion monitoring (CM) device 100 that can be disposed on a section of pipe to automatically provide regular updates on the corrosion status of the piping system 50. As discussed further below, the corrosion monitoring device 100 can provide water detection and freeze detection capabilities. An edge device can be a low point monitoring (LPM) device 1100 that provides for water detection and/or freeze detection at predetermined locations on the piping system 50. LPM devices 1100 can be disposed at one or more low points in the piping system 50 where water can accumulate. The LPM device 1100 can be disposed on a drum drip 22. An edge device can be a valve differential pressure monitoring (DPM) device 2100 that can monitor the air and water pressures to provide dynamic differential pressure protection across the dry pipe valve 20. The valve DPM device 2100 can monitor compressor air and/or dry pipe valve intermediate chamber air pressures in order to help identify conditions that can lead to a false trip of the fire suppression system. The valve DPM device 2100 can monitor temperatures to provide freeze detection.

The CM device 100 can provide corrosion data, such as information related to the current level of the corrosion and the rate of corrosion of a pipe in the piping system 50. The level of the corrosion of the pipe relates to the amount of corrosion the pipe has experienced (e.g., weight loss per area, loss of thickness of the metal, or some other measure of corrosion). Measuring the rate of corrosion can help predict when a portion of the pipe wall will be so thin that there is high likelihood of failure, e.g., leaks, and/or there could be a buildup that can cause blockage. Thus, measuring the rate of corrosion gives the user or business time to schedule maintenance instead of performing emergency maintenance on the piping systems. Accordingly, collecting the level of the corrosion and the corrosion rates will also help notify the user or business of potential problems caused by the corrosion such as, e.g., problems like pipe leaks that can lead to the initiation of false trips.

In addition to the level and/or rate of corrosion, the temperature of the inside of the pipe in the piping system 50, ambient temperature outside the pipe being monitored, and/or the presence or absence of water in the pipe being monitored can also provide useful information. For example, collecting live temperature readings inside and outside the pipes of the piping system can aid in determining whether there is the potential for the pipes to freeze, an issue that might go undetected until a leak (or leaks) occurs that inadvertently activates the fire suppression system. In addition, in fire suppression systems, a frozen pipe can also impede the flow of water when the fire system is activated, potentially leaving the fire sprinkler system useless. Further, the presence of water in a "dry" piping system can mean there are potential maintenance issues (e.g., a leaking valve) that need to be resolved. Also, because dry type fire systems are typically used in areas that are unheated and experience freezing temperatures, the presence of water can also mean a potential freezing issue that can lead to a broken pipe and loss of air pressure. Accordingly, along with determining the level and/or rate of corrosion, exemplary embodiments of CM device 100 can also sense the temperature of the pipe in the piping system 50, the ambient temperature, and/or the presence or absence of water in the pipe. In the case of a fire suppression system, determining the corrosion levels and/or rates, temperatures inside/outside a pipe in the piping system, and/or the presence or absence of water in the pipe will help prevent or mitigate false trips and other problems in a fire suppression system.

An edge device can be a LPM device 1100 that monitors areas of the piping system 50 that can collect water such as, e.g., low point drains located throughout the piping system 50. Low points are a typical feature built into dry type fire suppression systems and are placed in locations to help drain water from the piping system after the suppression system has been activated and/or to help drain accumulated condensation from the compressed air. These low points are often a source of issues for customers due to lack of maintenance (draining of accumulated water) and exposure to freezing temperatures. As indicated above, when a low point is full of water and exposed to freezing temperatures the expanding ice will typically burst the piping and cause a system trip (water flow). The LPM device 1100 can include a water detection sensor that monitors for the presence of water in a low point of the piping system 50 in order to prevent or minimize false trips. When water is detected, an alert is automatically sent to a user and/or corrective action is taken such as draining the pipe. Generally, however, water at a low point by itself may not be an immediate concern. A concern arises if there is a presence of water and the temperature of the pipe and/or ambient temperature indicates a possibility of the water freezing. The LPM device 1100 can include a pipe temperature sensor to monitor the temperature of the pipe at the low point and/or an ambient temperature sensor to monitor the surrounding ambient air.

The water detection sensor may not be used, and the edge device includes the pipe temperature sensor and/or the ambient air temperature sensor. An alert or corrective action can be automatically initiated based on the information from the water and/or temperature sensors to prevent or minimize false trips.

As discussed above, the fire suppression system maintains the ratio between the water pressure and the air pressure below a predetermined value, e.g., below 5.5, to keep the dry pipe valve closed during normal operation. However, fluctuations in the air and/or water pressures can lead to false trips of the fire suppression system. To monitor the differential pressures, can edge device can be a valve DPM device 2100 that includes pressure sensors to monitor the water pressure and the air pressure on the dry pipe valve. A pressure sensor can be disposed on the inlet of the drip pipe valve to monitor the water pressure and a pressure sensor is disposed at the outlet of the dry pipe valve to monitor the air pressure. An alert or corrective action can be automatically initiated based on the information from one or both of the pressure sensors to prevent or minimize false trips due to fluctuations in air and/or water pressure. In some exemplary embodiments, the valve DPM device 2100 includes a pressure sensor to monitor the compressor air pressure and/or a pressure sensor to monitor the intermediate chamber of the dry pipe valve. In some embodiments, the valve DPM device 2100 includes a temperature sensor to monitor the temperature of the water and/or a temperature sensor to monitor the ambient air temperature. Appropriate alerts or corrective action can be automatically initiated based on the information from any combination of the pressure sensors and/or the temperature sensor.

Each of the edge devices discussed above can be used independently or coordinated with other edge devices. The functions of each type of edge device are described separately below for clarity. However, the functions of one type of edge device can be combined with some or all of the functions of another type of edge device. For example, the LPM device 1100 can incorporate some or all of the CM device 100 and/or the valve DPM device, and similar functional combinations can be made for the other types of edge devices. Systems and methods described herein can be used to monitor corrosion, water presence, air and/or water pressure, and/or temperatures in other types of equipment and systems.

The edge devices can communicate over a network, e.g., in a star topology, to transmit data either directly or indirectly (e.g., via a local processing unit) to a gateway located on a customer's site, which then communicates with one or more remote computers and/or servers on e.g., a cloud network. For example, information received by the gateway from the edge devices can be transmitted via, e.g., a cellular connection to e.g., a cloud database for storage. Custom software located on the gateway handles the edge device data and packages it appropriately with the required security credentials needed to transport the data to the cloud. Once the data is transmitted to the cloud, the data can be processed through various algorithms to determine the health and status of the fire suppression system. If the health of the system is determined to have an issue, pre-programmed notifications are issued to alert a user of a current and/or a potential future problem such as, e.g., a false trip of the fire suppression system. In addition, data and/or information from the edge devices and/or the servers can be displayed, e.g., on a system specific dashboard, for easy viewing of current data, historic data, and real-time status of system health. The display can be a web browser-based and/or an app-based display on a mobile device and/or a stationary computer. The data can be measured periodically by the edge devices and the measured data can be transmitted on a regular basis and/or by using some other criteria to confirm that the edge device is functional and all measurements are current.

The techniques introduced here for the functions performed by the edge devices, such as, e.g., monitoring corrosion, water presence, water pressure, air pressure, and/or temperature, can be embodied as special-purpose hardware (e.g., circuitry), as programmable circuitry appropriately programmed with software and/or firmware, or as a combination of special-purpose and programmable circuitry or hardware. For example, the edge devices can utilize a programmable microprocessor made by MultiTech Multi-Connect® xDot™ that communicates over a LoRaWAN network. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The gateway can be an off-the-shelf product that is able to communicate with the edge devices via, e.g., over a LoRaWAN network using a LoRa protocol. Data received from an edge device can include proper identification of the source of the data such that the gateway is able to decipher a unique identifier number of the edge device, the data payload, and a timestamp of when it received the data. Agent software in the gateway can package the received data for transport over a network to a remote server(s), e.g., a cloud. Application Programing Interfaces (APIs) can be used to ensure the data is transported properly and to verify that the data is from a trusted secured source. For example, the software agent ensures that the data from the edge devices conforms to the requirements of the cloud by using the cloud's APIs. In some embodiments, cellular technology is used to transmit the data from the edge devices to the cloud. Data from the edge devices can be transmitted using a number of other methods such as, e.g., Ethernet, dial-up, etc.

The cloud platform can store data in a database for analysis and allow the host to view the data and/or analysis results in real-time using, e.g., a web-based and/or an app-based dashboard. The cloud can include a rules engine to autonomously analyze the data and/or information from the edge devices. Each edge device type can include its own data model, which describes the data inputs that the database will receive for that type of system. Each data model is assigned a set of rules that will process the data from the data model and react to the analysis accordingly. If any of the rules indicate a problem, an alert notification is generated and sent to the user based on the priority of the problem. The notification can be sent via electronic communication such as, e.g., E-mail, SMS, Push Notification, or some other electronic communication method. Notifications can be displayed on a user device via, e.g., a web dashboard to better understand what event is taking place so that the user can take appropriate action to address the problem event.

FIGS. 2A 2B, 2C, and 2D depict a corrosion monitoring sensor assembly 102 that includes a plug insert 143 and a housing 144. The plug insert 103 can be a separate component from housing 144 and is disposed in the housing 144. The plug insert 143 can be secured in the housing 144 via a press fit or a threaded connection. The plug insert 143 and the housing 144 can form an integral unit. The sensor or sensors of the sensor assembly 102 can be disposed in the plug insert 143. The plug insert 143 can include one or more corrosion sensors having a geometric shape that permits determination of information relating to at least one of a corrosion level and a rate of corrosion of the monitored equipment based on an electrical characteristic of the at least one corrosion sensor. The corrosion sensors can be coupon portions 106 that form at least part of wire loop 105. The ends of the wire loops 105 can be attached, e.g., by soldering or another means of attachment, to wire leads that are then routed outside the housing 144 of the sensor assembly 102. Depending on the type of sensor assembly, the plug 143 can include a temperature sensor 120 to monitor the pipe temperature, an ambient temperature sensor 125 (see FIG. 3), or any combination of the temperature sensors 120 and 125 and the one or more corrosion sensors. The leads from the wire loops 105 and the temperature sensors 120 and 125 can be connected to a monitoring circuit 104 as discussed below.

The plug insert 143 can have a low electrical conductivity and/or a low thermal conductivity. The plug insert 143 can be made of a plastic. In some embodiments, the plug insert 143 is composed of a thermoset material, such as a thermoset material that is in compliance with the Underwriter Laboratories (UL) standards concerning fire suppression systems. For example, the plug insert 143 can be composed of a silicon material, urethane material, another type of thermoset material, or any combination thereof. In some embodiments, the plug insert 143 is made of a thermoplastic such as an acrylonitrile butadiene styrene (ABS) plastic. The composition of the plug insert 143 can be made of a metal or metal alloy, a thermoset plastic, a thermoplastic, a ceramic, or a combination thereof, as appropriate. The plug insert 143 and/or the housing 144 can be made of a material that is non-conductive electrically. The plug insert 143 and/or the housing 144 can be made of a material that is rated to at least 250 deg. F. The housing 144 can be in the shape of a threaded pipe plug with threads 146, such as the shape of a standard threaded pipe plug. For example, the housing 144 can be in the shape of a 1 inch National Pipe Thread (NPT) threaded pipe plug (or some other standard pipe plug size) with a head portion 147 that is hexagonal in shape or some other shape that facilitates installation using a tool (e.g., a hex socket). The housing 144, including head portion 147, can have various shapes as appropriate for the equipment being monitored. The housing 4 can be made of a metal or a metal alloy, such as a metal or a metal alloy that is more resistant to corrosion than the equipment being monitored. The housing 144 can be made of the same material as the equipment being monitored. The composition of the housing 144 can be made of a metal or metal alloy, a thermoset plastic, a thermoplastic, a ceramic, or a combination thereof, as appropriate. In some embodiments, the housing 144 and the plug insert 143 are one integrated unit. The integrated housing 144 and plug insert 143 can be injection molded. The composition of the integrated housing 144/plug 143 is not limiting and can be made of a metal or metal alloy, a thermoset plastic, a thermoplastic, a ceramic, or a combination thereof, as appropriate. The housing 144 can be rated for the same or higher pressures and temperatures as the pipe. The housing 144 can be rated at 2 to 3 times the operating pressure of the piping system 50. In the case of piping systems for fire sprinklers, the equipment can operate from 150 psi to 175 psi; for example, the housing 144 can be rated in a range from 300 psi to 525 psi. For example, in a piping system for fire sprinkler systems, the threaded pipe plug can be rated up to 400 psi. The housing 144 can be a pipe plug that is rated up to 1600 psi and, in some embodiments, up to 3000 psi.

Figure 6A:
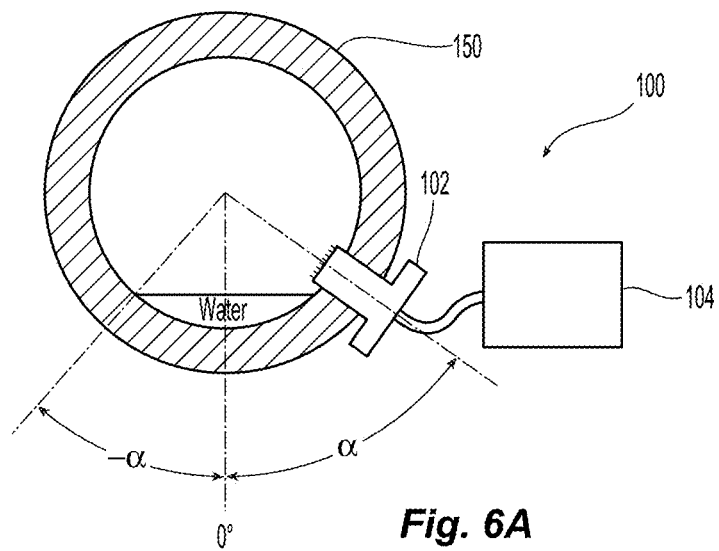
FIGS. 6A and 6B depict an arrangement of a corrosion monitoring device in dry-pipe and wet-pipe systems, respectively.
Figure 6B:
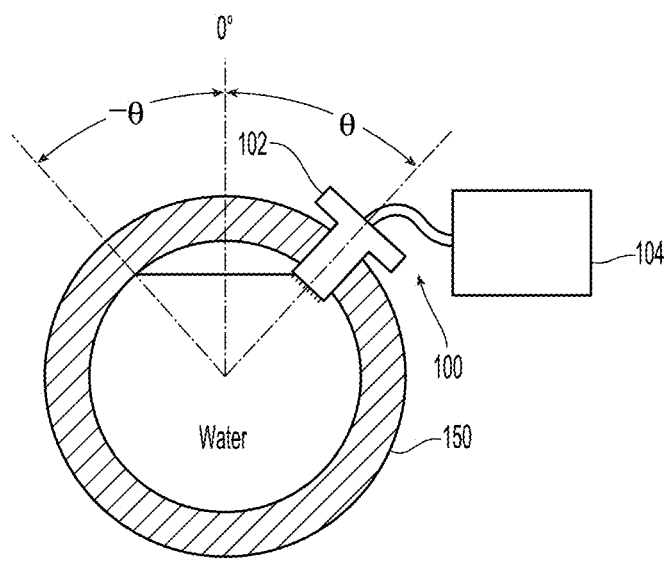
Figure 7A:
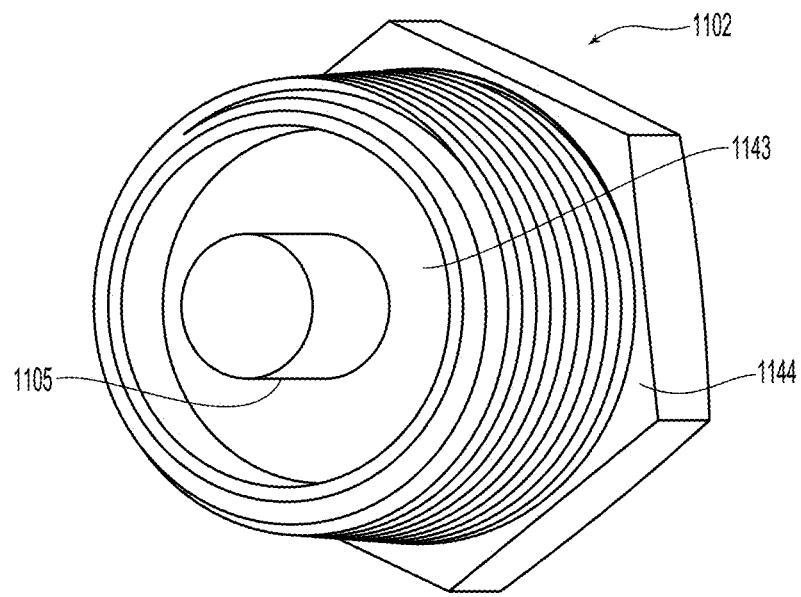
FIG. 7A is a perspective view of a low point monitoring sensor assembly.
Figure 7B:
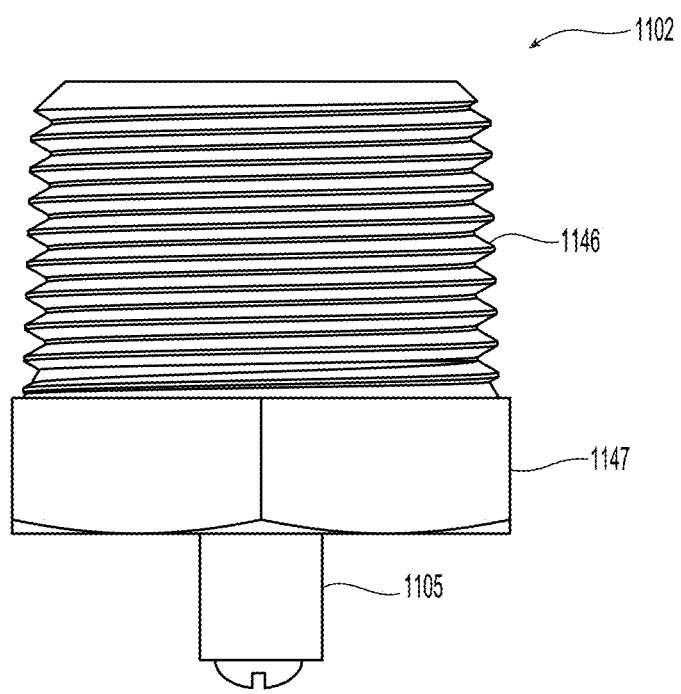
FIG. 7B is a side view of a low point monitoring sensor assembly of FIG. 7A.
Figure 7C:
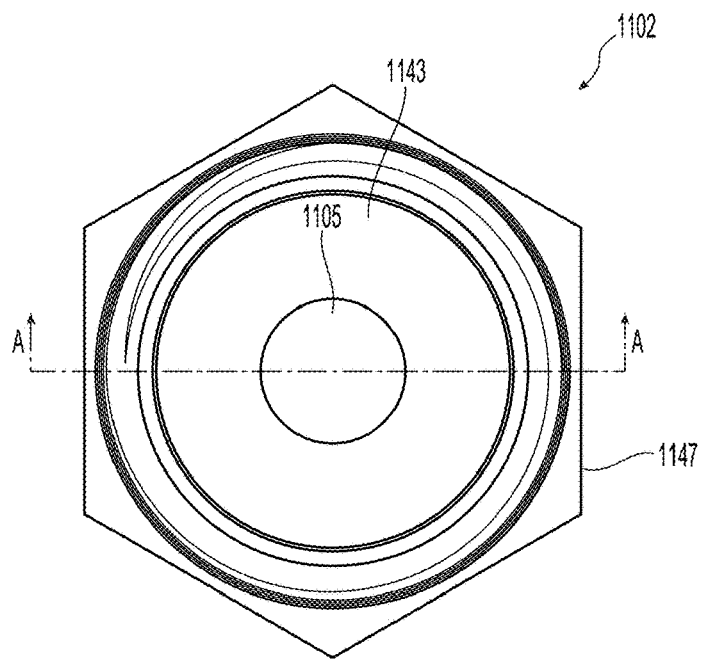
FIG. 7C is a top view of a low point monitoring sensor assembly of FIG. 7A.
Figure 7D:
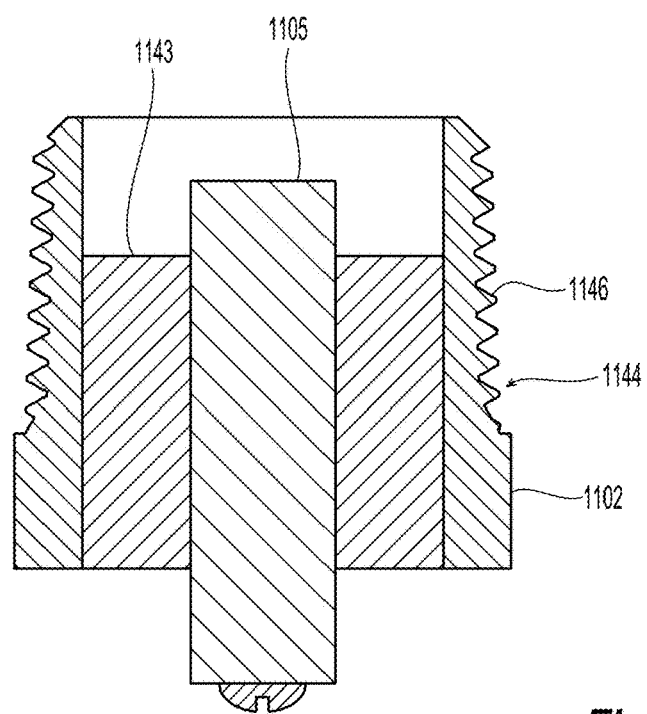
FIG. 7D is a side cross-sectional view of a low point monitoring sensor assembly of FIG. 7A.

When installed in the pipe, the coupon portions 106*a*-106*d* can be exposed to the internal environmental of the pipe (e.g., see pipe 150 in FIGS. 6A and 6B), so that the CM device 100 can monitor the rate of corrosion of the wall of the pipe as discussed in more detail below. As discussed above, the corrosion monitoring sensor assembly 102 can include one or more wire loops 105 that are disposed in the plug insert 143. FIGS. 2A-2D illustrate the corrosion monitoring sensor assembly 102 including four wire loops 105*a*-105*d*. The corrosion monitoring sensor assembly 102 can have any number of wire loops 105 such as, e.g., one, two, three, four, or more wire loops 105. Each of the wire loops 105*a*-105*d* respectively can include a coupon portion 106*a*-106*d* that is configured to corrode. As depicted in FIGS. 6A and 6B, at least the coupon portion 106*a*-106*d* of each of the wire loops 105*a*-105*d* can be exposed to the same corrosive environment that the interior of the pipe 150 is exposed to. The corrosion monitoring sensor assembly 102 can be mounted in a horizontal section of the pipe 150. The corrosion monitoring sensor assembly 102 can be mounted in a vertical section of the pipe 150 and/or in a slanted section of the pipe 150. The coupon portions 106*a*-106*d* can be elongated members having a length greater than a diameter. The coupon portions 106*a*-106*d* can be made of material that is the same as the equipment being monitored, e.g. the same material as the interior wall material of pipe 150, so that a rate of corrosion of the coupon portion 106*a*-106*d* matches a rate of corrosion of the pipe. For example, for a carbon-steel pipe, the coupon portions 106*a*-106*d* can be made of the same carbon-steel material. For a black steel pipe, the coupon portions 106*a*-106*d* can be made of the same black steel material. In some embodiments, one or more of the coupon portions 106 is not made of the same material as the pipe but is made of a material where the level of corrosion of the coupon portion can still be correlated to the level of corrosion (e.g., weight loss per area, loss of thickness, or some other measure of corrosion) of the pipe and/or the rate of corrosion of the coupon portion can still be correlated to the rate of corrosion (e.g., mpy or mmy) of the pipe. In the case of coated equipment such as coated pipes, the coupon portion 106 is made of the base metal and is not coated so as to provide an early indication of potential corrosion problems. In some embodiments, the coupon portion 106 can also be coated to match the coating on the pipe. For example, if the pipe being monitored is galvanized, the coupon portion 106 can also be galvanized.

At least one coupon portion 106 has a different thickness or diameter than the other coupon portions 106. In some embodiments, each of the coupon portions 106*a*-106*d* has a different thickness or diameter than the other coupon portions 106. The shape or geometry of the coupon portion 106 is not limiting so long as the measured level and/or rate of corrosion can be correlated to the level and/or rate of corrosion with respect to a pertinent parameter of the pipe, e.g., the thickness of the pipe wall. For example, where the continuity of the coupon 106 is being monitored, e.g., whether the coupon 106 open circuited or not, the shape or geometry of the coupon 106 can be such that the coupon portion 106 loses continuity (e.g., opens) prior to the pipe 150 reaching an unsatisfactory state. For example, the coupon 106 can lose continuity (open) prior to the walls of the pipe 150 thinning to a point where failure has occurred or is imminent. The coupon portion 106 can have a uniform shape with respect to the exposed surface area, e.g., a uniform thickness with respect to the exposed surface area. A geometric shape of the coupon portion 106 can include a portion having a constant diameter (uniform thickness) such as, e.g., a cylindrical shape. The orientation of the coupon portion 106 can be such that the entire surface area of the coupon portion 106 is exposed to the corrosive environment. For example, if there is not enough of a gap between the coupon portion 106 and the top surface of the plug 143 and/or if there is not enough gap between a coupon portion 106 and another component (e.g., another coupon portion, wall of the sensor assembly, or another component), as the metal from coupon portion 106 corrodes and migrates, a buildup of the corroded material can potentially block (either partially or entirely) the coupon portion 106 from the corrosive environment. When this occurs, the coupon portion 106 can give false readings with respect to the monitored electrical characteristic. For example, the continuity can indicate closed when the coupon portion 106 is actually open. The coupon portion 106 can be disposed or oriented such that the entire surface area of the coupon portion 106 remains exposed to the corrosive environment for the life of the coupon portion 106.

Coupon portion 106 is not limited to a specific diameter or thickness. Generally, a smaller diameter/thickness coupon is used when a faster corrosion reading is desired. The coupon portion 106 can have a diameter or thickness that is in a range from about 0.003 inches to 0.050 inches. At least one coupon portion 106 can have a surface area that is different from the surface areas of the other coupon portions 106. In some embodiments, each coupon portion has a surface area that is different from the other coupon portions. A difference in the diameter or thickness of a given coupon portion 106 and a diameter or thickness of the next larger coupon portion 106 is in a range from about 0.002 inch to about 0.035 inch. When four coupon portions 106*a*-106*d* are used, the diameters or thickness of the coupons 106 can be within ±10% of 0.014 inch, 0.018 inch, 0.0347 inch, and 0.047 inch, respectively. The diameters and thickness can depend on the piping system being monitored, the required or preferred resolution on the level/rate of corrosion, the preferred notice time for the corrosion, or some other criteria. For example, because a percentage change in the resistance of a thinner coupon portion 106 will be greater than a thicker coupon portion 106, if a user requires a higher resolution and/or an early alarm (early notice time) on the onset of any measurable corrosion, at least one of the coupon portions 106 may be much thinner than the rest.

If a coupon portion 106 having the smallest thickness or diameter has corroded to a point where the corresponding wire loop 105 open circuits (e.g., breaks), the other wire loops 105 can still be closed to provide an indication of the level and/or rate of corrosion of the equipment being monitored going forward. Accordingly, by providing coupon portions 106 with different thicknesses or diameters, the control circuit connected to the corrosion monitoring sensor assembly 102 (e.g., control circuit 104 discussed further below) can monitor the corrosion of the wall of pipe 150 over an extended period of time. That is, when one coupon portion 106 breaks, a corrosion level and/or rate is calculated. Because their thicknesses or diameters are larger, the other coupon portions 106 remain intact, and thus there is no need to immediately replace the corrosion sensor assembly 102. The thickest coupon portion 106 can be sized such that the sensor assembly 102 need not be replaced for 10 to 15 years. This is advantageous for monitoring the piping in fire systems, which typically last 50 to 100 years. By appropriately configuring the number and thicknesses/diameters of the coupons, the number of times a sensor assembly needs to be replaced can be minimized. The coupon portions 106a-106d cam be sized such that the lifetime of the corrosion monitoring sensor assembly 102 is approximately the same as or longer than the lifetime of the equipment being monitored.

In some embodiments, the use of coupon portions 106 with different thicknesses or diameters allows for the rate of corrosion to be precisely tracked throughout the entire time period that the equipment is being monitored. For example, the coupon portions 106 can be such that, as the thinnest of coupon portions 106 open circuits due to corrosion or has reached a point where the change in resistance of the coupon portion cannot be accurately correlated to the level and/or rate of corrosion of the equipment, the next thinnest of coupon portions 106 reaches a thickness or diameter where the accuracy of the change in resistance readings is equal to or substantially equal to the original thickness or diameter of the coupon portion that just open circuited. This process can continue for the remaining coupon portions 106. That is, the thickness or diameter of the next thinnest remaining coupon portion 106 is the same or substantially the same as (e.g., within ±25%) the original thickness or diameter of the thinnest coupon portion 106. In this way, the control circuit monitoring the sensor assembly 102 can accurately track the level and/or rate of corrosion of the equipment being monitored over an extended period of time when compared to having just one wire loop 105 that is initially very thick. By accurately monitoring the corrosion rate over an extended period of time, any change in the level and/or rate of corrosion can also be detected and brought to a user's attention, if necessary, as the coupon portions 106 corrode away.

Figure 3:
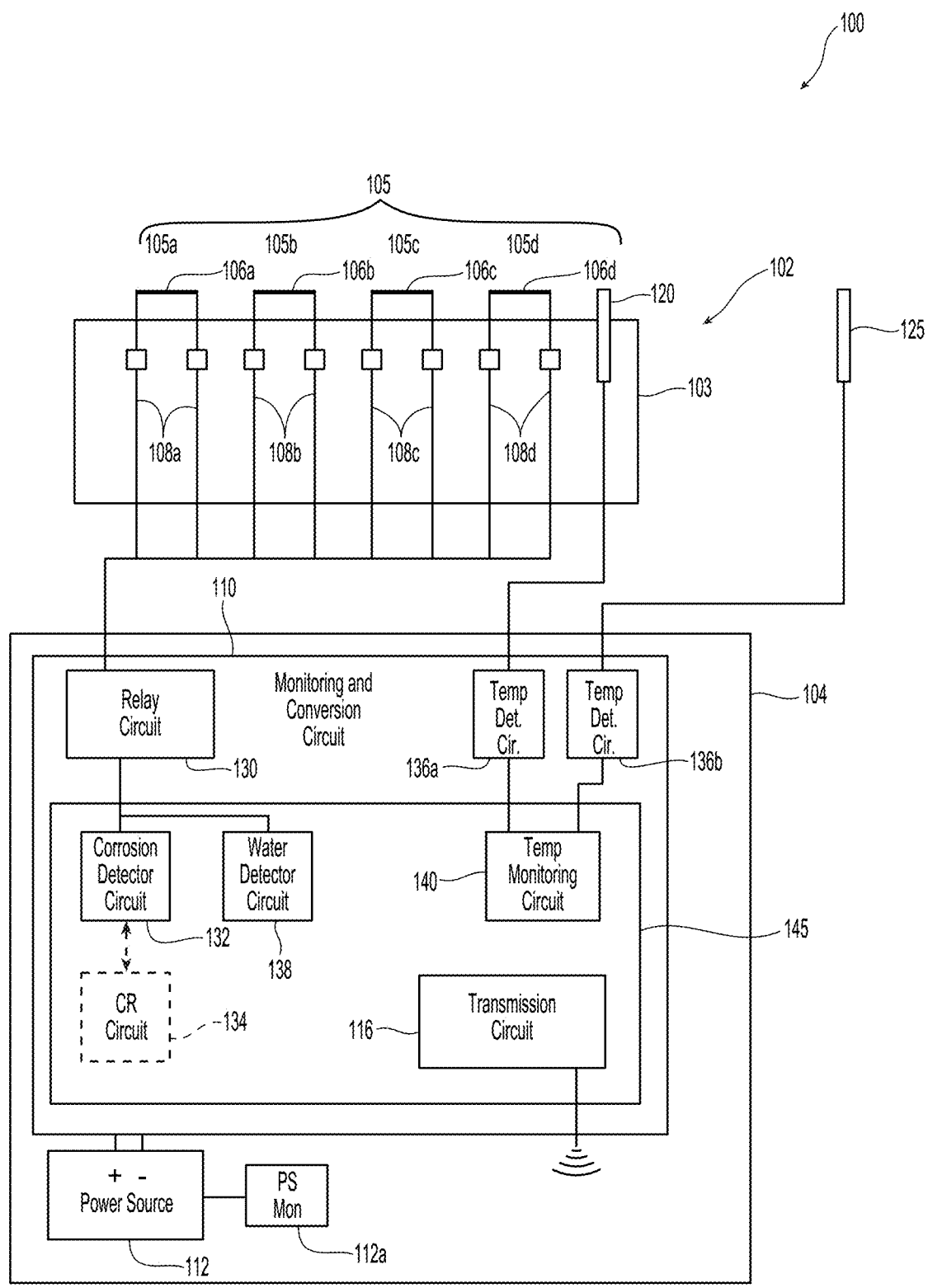
FIG. 3 is a block schematic view of a corrosion monitoring device.

FIG. 3 depicts a schematic block diagram of a CM device 100. The CM device 100 includes a sensor assembly 102 with corrosion sensors and/or temperature sensors, as discussed above. The CM device 100 can include a control unit 104 that monitors the sensor assembly 102. As depicted in FIG. 3, the control unit 104 can include a corrosion monitoring and conversion circuit 110. The corrosion sensors in sensor assembly 102 can be coupon portions 106 that are configured to corrode at a rate that can be correlated to a rate of corrosion of the monitored equipment. The corrosion monitoring and conversion circuit 110 can monitor an electrical characteristic of the coupon portion 106. In some embodiments, a change in the electrical characteristic is also determined from a previously determined electrical characteristic. The change in the electrical characteristic can be a change in the actual value of the monitored electrical characteristic and/or a percentage change in the value of the monitored electrical characteristic.

Figure 4:
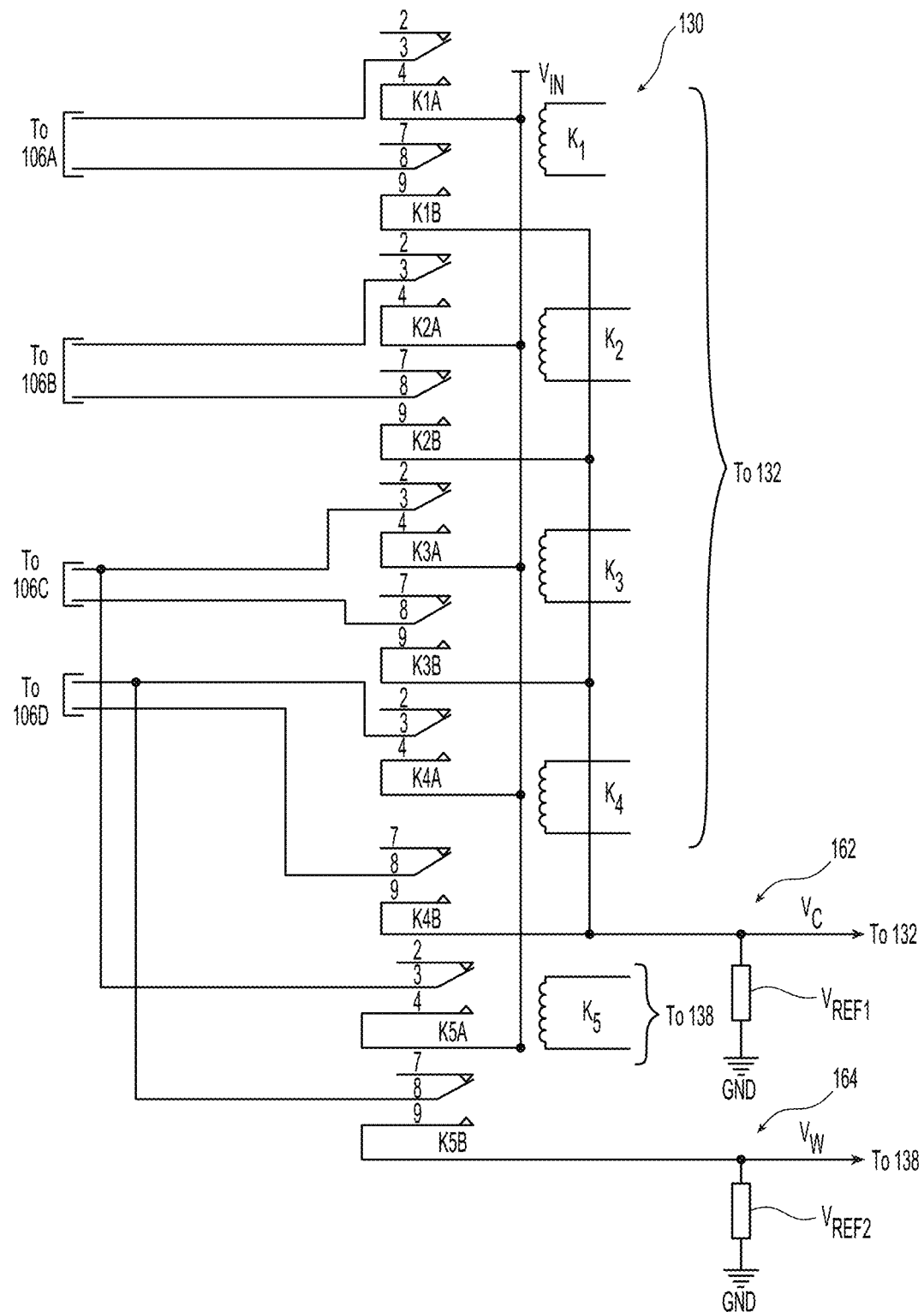
FIG. 4 is a schematic view of a relay circuit of a corrosion monitoring device.

The corrosion monitoring and conversion circuit 110 can provide currents that respectively flow through coupon portions 106A-106D of the respective wire loops 105A-105D. In some embodiments, the corrosion monitoring and conversation circuit 110 can include a corrosion detector circuit 132 to measure the electrical characteristic of the wire loop 105 and/or the coupon 106 and determine information related to the corrosion level and/or the rate of the equipment being monitored based on the measured electrical characteristic. The electrical characteristic being monitored by the corrosion detector circuit 132 can be a voltage of the coupon portion 106 and the information being determined is whether coupon portion 106 and thus wire loop 105 has continuity or not, e.g., still forms a closed loop or has open circuited. For example, FIG. 4 depicts a relay circuit 130 that includes a voltage divider circuit 162 that can be used for determining a corrosion state of the coupon 106. The voltage divider circuit 162 includes relays K1-K4, a voltage source providing a voltage $V_{IN}$, and a reference resistor $R_{REF1}$ having a known resistance. Reference resistor $R_{REF1}$ also serves as a pull-down resistor to keep the voltage $V_c$ from floating when the respective coupon portion 106 has corroded open and/or when relays K1-K4 are de-energized. Each relay K1-K4 can be operated, e.g., by a microprocessor (not shown) or other circuit, which can be part of the corrosion monitoring and conversation circuit 110. The microprocessor or other circuit can be part of the relay circuit 130. Each coupon portion 106a-106d can be respectively connected to the contacts corresponding to relays K1-K4. The coupon portions 106a-106d can be selectively connected. The coupon portions 106a-106d serve as the other "resistor" of the voltage divider circuit 162 when each relay K1-K4 is selectively operated. Based on the relay K1-K4 that is operated, a predetermined known voltage $V_{IN}$ is applied to one end of the corresponding coupon portion 106a-106d and a voltage $V_c$ can be read at the other end of the coupon portion 106a-106d. The voltage $V_c$ can be transmitted to and measured by the detector circuit 132. For example, when relay K1 is energized, a voltage $V_{IN}$ is applied to one end of coupon portion 106a via terminal K1-3 of relay contact K1A, and the voltage $V_c$ is read by corrosion detector circuit 132 via terminal K1-9 of relay contact K1B. Similarly, as relays K2-K4 are selectively energized, the corresponding voltage $V_c$ values for coupon portions 106b-106d are transmitted to and read by corrosion detector circuit 132. The voltage $V_c$ value measured by the corrosion detector circuit 132 is then read by the corrosion conversion circuit 134 to determine if the appropriate coupon portion 106 has open circuited due to corrosion or if there is still some continuity. The VI value can be predetermined and known. In some embodiments, the value of $V_{IN}$ is stored in memory in the monitoring and conversion circuit 110 (or some other appropriate place) and accessible to the corrosion detector circuit 132 so that a separate measurement of $V_{IN}$ is not required. In some embodiments, the $V_{IN}$ value is measured by the corrosion detector circuit 132 when calculating the ratio $V_c/V_{IN}$. In some embodiments, the stored value of $V_{IN}$ can be updated either manually or automatically updated based on any variance in the $V_{IN}$ value, e.g., due to the output of power source 112 starting to drop. The corrosion detector circuit 132 can compare the ratio $V_c/V_{IN}$ to a predetermined value that corresponds to lack of continuity, e.g., an open circuit. In some embodiments, the value of $V_{IN}$ is the same as the voltage supplied to the relay circuit 130 and the analog to digital conversion circuit (ADC) in corrosion detector circuit 132. Because the same reference voltage is used for the ADC and the relay circuit 130, the measure voltage $V_c$ can be directly compared to a predetermined value that corresponds to lack of continuity, i.e., an open circuit.

For example, if the ratio is above the predetermined value, the corrosion detector circuit 132 determines that the corresponding coupon portion 106 has continuity, e.g., coupon portion 106 is not broken, and if the ratio is equal to or below the predetermined value, the corrosion detector circuit 132 determines that the corresponding coupon portion 106 is open, e.g., that the coupon portion 106 has corroded to a point that there is a complete physical break and the wire loop 105 has open circuited. In some embodiments, the measured voltage $V_c$ is directly compared to a predetermined value. The predetermined value for determining whether there is an open circuit (whether for comparison with a ratio or directly to $V_c$) can be different based on whether the sensor assembly 102 is wet or dry. If wet (e.g., the sensor assembly 102 is in water), a current can still flow through the water to complete the current loop even after the coupon breaks, but $V_c$ will be lower due to the increased resistance of the current path through the water. If dry (e.g., the sensor assembly 102 is not in water), $V_c$ will be zero. Accordingly, the predetermined value can depend on whether the sensor assembly 102 is wet or dry. In some embodiments, the predetermined value is the same regardless of whether the sensor assembly 102 is wet or dry. The determination of whether coupon 106 has corroded open or not is used in determining the level and/or rate of corrosion of the equipment being monitored. The determination of the level and/or rate of corrosion can be done in the monitoring and conversion circuit 110 and/or on a remote server or computer.

A constant voltage drop can be provided across the respective coupon portions 106a-106d and a current through the coupon portions 106a-106d can be measured by the sensor assembly 102 to determine whether there is an open circuit. When the coupon 106 breaks due to corrosion, the current through the respective wire loop 105 can be lower or zero (depending on where the sensor assembly 102 is in water or not). Accordingly, in some embodiments, the measured current can be used to determine whether the coupon 106 has corroded open. For example, a ratio of the measured current to a reference current (e.g., the current through an un-corroded coupon) can be compared to a predetermined value or the actual measured current can be compared to a predetermined value. A constant current can be transmitted (or attempted) through the respective coupon portions 106a-106d and a voltage drop across the wire loop 105a-105d and/or the respective coupon portion 106a-106d can be measured to determine whether the coupon portion 106 has corroded open. A ratio of the measured voltage to a reference voltage (e.g., the voltage across an un-corroded coupon) can be compared to a predetermined value or the actual measured voltage can be compared to a predetermined value. There may be a higher voltage drop across coupon 106 as compared to an un-corroded coupon 106 when the coupon 106 has corroded open.

The measured voltage and/or current readings can be used to determine the actual corrosion level and/or rate prior to the coupon portion 106 corroding open. For example, a change in the voltage and/or current measurements can be correlated to a change in the corrosion of the coupon portion 106 (and thus the pipe) even before the coupon portion 106 has corroded open.

In some embodiments, the electrical characteristic can be a resistance value. For example, the voltage and/or current measurements discussed above can be used to determine a resistance value of the coupon 106, which can then be correlated to level and/or rate of corrosion of the equipment being monitored. For example, the corrosion detector circuit 132 can be configured to determine a resistance of the coupon 106. The corrosion detector circuit 132 can be configured to output a current through each of the wire loops 105A-105D. The corrosion detector circuit 132 can include a sensor to sense the current through at least one wire loop 105 (e.g., via known current sensors). The corrosion detector circuit 132 can provide a constant or near constant voltage drop across the coupon portions 106a-106d such that the respective current through each of the loops 105A-105D varies in time based on the amount of corrosion the respective coupon portions 106a-106d have experienced. For example, the coupon portions 106 are configured to corrode such that, as the coupon portions 106a-106d corrode, the current through each wire loop 105a-105d changes due to a decrease in the cross-sectional area of each coupon portion 106a-106d, which increases the resistance in the respective coupon portion 106a-106d. Based on the sensed value or values of each coupon portion 106a-106d, the corrosion detector circuit 132 (or another device such as monitoring platform 230 —see FIG. 11) can calculate respective resistance values of the coupon portions 106a-106d, which can include instantaneous resistance values and/or averaged resistance values. In some embodiments, the corrosion detector circuit 132 can keep the current through each wire loop 105A-105D constant while sensing the voltage drop across each coupon portion 106a-106d. The measured voltage drop can then be correlated to a resistance value. The change in the resistance values can then be correlated to a level and/or rate of corrosion of the equipment being monitored.

The electrical characteristic can be an inductance value of the coupon 106. For example, the coupon 106 can be in the shape of a coil or some other shape that is appropriate for measuring inductance and the power to the coupon 106 can be an AC waveform (e.g., pulsed sinusoidal, etc.), a pulsed DC waveform, a stepped waveform, and/or another non-constant waveform. As the coupon 106 corrodes, its inductance will change, and the measured change in inductance is correlated to a level and/or rate of corrosion of the equipment being monitored.

Regardless of the type of electrical characteristic being measured or the sensing method being used (sensed voltage or sensed current), the $i^2r$ heating of the coupon portions 106a-106d may not adversely affect the calculations and/or is taken into account when determining the electrical characteristic of the coupon portions 106a-106d.

As depicted in FIG. 3, the corrosion monitoring and conversion circuit 110 includes a corrosion rate circuit 134 that receives the information related to the corrosion level and/or the rate of the equipment being monitored from the corrosion detector circuit 132. Based on the received information, the corrosion rate circuit 134 correlates the information regarding the electrical characteristic of the corrosion sensor 106 to a level of the corrosion (e.g., weight loss per area, loss of thickness of the metal, or some other measure of corrosion) and/or a rate of corrosion (e.g., mpy or mmy) of the equipment being monitored, e.g., the wall of pipe 150. For example, if the corrosion detector circuit 132 determines that a coupon portion 106 has opened, i.e., the continuity of the coupon portion has changed from having continuity to open (no continuity), the corrosion detector circuit 132 sends information to the corrosion rate circuit 134 that the appropriate coupon portion 106 has an open circuit status. The corrosion rate circuit 134 receives the status information from the corrosion detector circuit 132 and calculates the corrosion weight loss for the appropriate coupon potion 106. As an example, for a coupon portion having a 0.014 inch diameter, a density of 7.85 grams/cm³, and an exposed area of 0.012 square inches, when the status of that coupon portion shows an open circuit, the corrosion rate circuit 134 will determine that the weight loss of the coupon portion is 0.005 grams. For each coupon size, the weight loss at the time that the coupon portion 106 has an open status can be determined empirically. The corrosion rate circuit 134 can correlate the weight loss per area of the coupon portion 106 to the weight loss per area of the equipment being monitored, e.g., the weight loss per area of the wall of pipe 150. These correlations can be determined empirically (e.g., the correlation between change in the electrical characteristic to the estimated loss of weight per area of the coupon portion and the correlation between the estimated loss of weight per area of the coupon portion and the estimated loss of weight per area of the equipment can be determined empirically). When the coupon portion 106 is made of the same material as the equipment being monitored, the weight loss per area of the coupon portion 106 will be the same (e.g., within ±25%) of the weight loss per area of the pipe, e.g., the wall of pipe 150. Based on the calculated weight loss per area (either of the coupon portion 106 or the pipe), in some embodiments, the corrosion rate circuit 134 can calculate the corrosion rate (CR) in, e.g., mils per year (mpy) or another measure. Based on the appropriate weight loss value (coupon or equipment) determined above, the corrosion rate (CR) of either the coupon portion 106 or the equipment being monitored can be calculated using the equation: $CR=(WL*K)/(D*A*ET)$; where WL is weight loss (e.g., grams); D is alloy density (e.g., g/cm 3); A is exposed area (e.g., $in^2$, $cm^2$); ET is exposure time (e.g., hours); and K is $5.34*10^5$ for calculating mpy when A is in$^2$, $3.45*10^6$ for calculating mpy when A is cm$^2$, and $8.76*10^4$ for calculating mmy when A is cm$^2$. The exposure time ET can be based on a start time stamp corresponding to when the sensor assembly 102 is installed and an end time stamp corresponding to when the corrosion detector circuit 132 measured the electrical characteristic. The corrosion rate circuit 134 can categorize the severity of the corrosion based on the calculated corrosion rate. For example, the corrosion rate circuit 134 can categorize a CR value in arrange from 0 to 3 mpy as "NORMAL CORROSION RATE," a CR value in a range from above 3 to 5 mpy as an "INTERMEDIATE CORROSION RATE," and a CR value in a range from above 5 mpy as an "ACCELERATED CORROSION RATE." Of course, more or less categories can be used to classify the severity and other range values can be used for each category.

In some embodiments, the corrosion monitoring and conversion circuit 110 does not include corrosion rate circuit 134 and the corrosion level and corrosion rate calculations discussed above are performed by another device such as, e.g., monitoring platform 230. The other device, e.g., monitoring platform 230, can be implemented using a cloud networking system and includes a computational engine to perform the corrosion level and corrosion rate calculations discussed above. In such cases, the measured electrical characteristic and/or a change in the measured electrical characteristic (or information related to the electrical characteristic) can be transmitted by control unit 104 to the other device for processing. Whether performed by corrosion monitoring and conversion circuit 110 or an external device (e.g., monitoring platform 230), the information related to electrical characteristic values, changes in the electrical characteristic values, corrosion level, and/or corrosion rate is transmitted to a user. An indication of the severity of the corrosion rate can be presented to a user in text format (e.g., NORMAL, INTERMEDIATE, ACCELERATED), as the actual value (e.g., in mpy or mmy), as a color indication (e.g., green for normal, yellow for intermediate, and red for accelerated) and/or using some other indication. Depending on the severity of the corrosion rate and/or level, remedial action can be taken either manually by the operator or automatically by the corrosion rate circuit 134 or by another device (e.g., monitoring platform 230) to prevent a false trip, such as, e.g., placing the fire suppression system off-line until the corrosion problem is evaluated and/or corrected.

The weight loss can be calculated based on a change in an electrical characteristic other than continuity. For example, when resistance of each coupon portion 106 is being monitored, the corrosion rate circuit 134 correlates the change in resistance values to a loss of weight (e.g., in grams) per area of the respective coupon portions 106. In some embodiments, when more than one wire loop 105 is used, the loss of weight can be averaged over the number of wire loops 105. For example, the calculated change in resistance readings of the wire loops 105 can be averaged. The corrosion rate circuit 134 can correlate the loss of weight per area of the coupon portion 106 to an estimated loss of weight per area of the pipe, e.g., the loss of weight per area of the wall of pipe 150. The correlations can be determined empirically (e.g., the correlation between change in resistance values to the estimated loss of weight per area of the coupon and the correlation between the estimated loss of weight per area of the coupon and the estimated loss of weight per area of the pipe). A change in a voltage measurement of the coupon portion 106, a current measurement through coupon portion 106, and/or an inductance measurement of coupon portion 106 can be correlated to loss of weight per area of the coupon portion 106, which can then be used to calculate the loss of weight per area of the pipe.

When more than one wire loop 106 is used, the level/rate of corrosion calculated using the change in electrical characteristic of one coupon portion 106 is compared to the level/rate of corrosion calculated using the other coupon portions 106, as a means to verify the accuracy of the level of corrosion and/or the rate of corrosion. For example, the continuity of the thinnest coupon portion 106 is compared to the continuity results of the other coupon portions for inconsistencies. As an example, if the open circuit pattern deviates from the thinnest coupon opening first to the thickest coupon opening last, an alert can be initiated indicating that the corrosion readings may be unreliable. That is, if a coupon portion 106 indicates that it is open but a thinner coupon portion 106 still indicates continuity, the corrosion monitoring and conversion circuit 110 (or another device) can be configured to initiate an alert that the readings from corrosion monitoring sensor assembly 102 are unreliable. Electrical characteristic readings (e.g., voltage, current, resistance, inductance, etc.) that are bad and/or are suspect are ignored when calculating the change in the electrical characteristic for the coupon portions 106. For example, if the level/rate of corrosion calculated from monitoring coupon portion 106a is different from the level/rate of corrosion calculated from monitoring coupon portions 106b-106d by a predetermined amount, the monitoring device 100 can be configured to ignore the electrical characteristic readings from coupon portion 106a and keep monitoring the other coupon portions, i.e., coupon portions 106b-106d in this case. The corrosion level and/or the corrosion rate can be determined in real time based on the current and historical electrical characteristic readings.

As depicted in FIG. 3, the monitoring device 100 can include a temperature sensor 120 in some exemplary embodiments. The temperature sensor 120 can be disposed in corrosion monitoring sensor assembly 102 and senses the temperature of the corrosive environment. For example, temperature sensor 120 can sense the temperature of the inside of pipe 150. The monitoring and conversion circuit 110 can include temperature detector circuit 136a that receives the signal from temperature sensor 120 and converts the sensor signal to a temperature value. The temperature sensor 120 can be e.g., a thermocouple, RTD, or a thermistor (NTC or PTC). In some embodiments, the temperature sensor 120 is a 10K NTC thermistor. The temperature value from sensor 120 can be read by appropriate circuitry in corrosion monitoring and conversion circuit 110 or another device (e.g., monitoring platform 230) to predict potential problems due to the temperature, e.g., problems such as whether and when any water in the pipe (e.g., pipe 150) will freeze.

Figure 5:
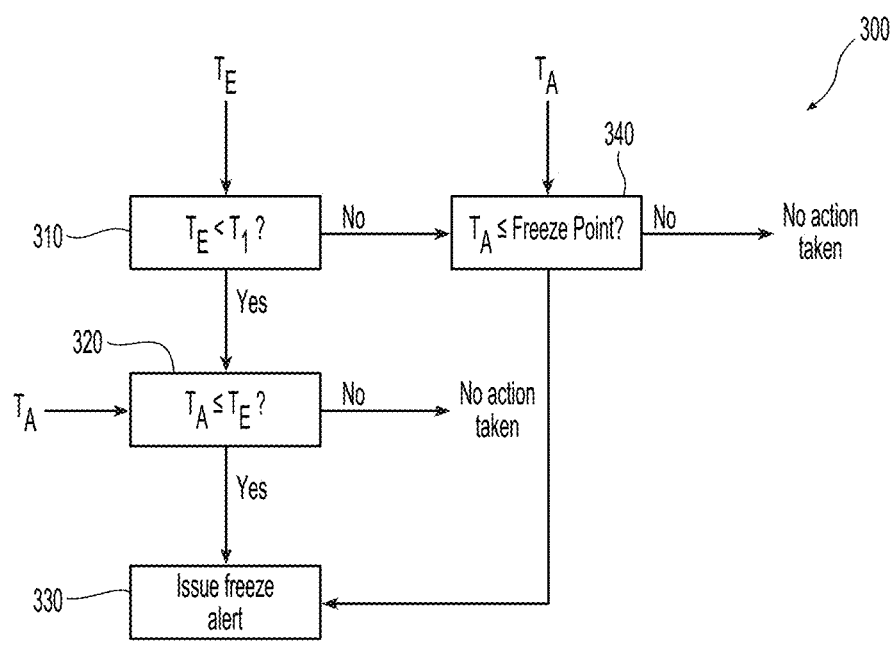
FIG. 5 is a flow diagram of a method of determining when a freeze alert should be issued to be executed by a temperature monitoring circuit of an edge device.

In some embodiments, a second temperature sensor 125 senses the ambient temperature outside the pipe. For example, the temperature sensor 125 can sense the temperature of the ambient air surrounding the pipe 150. The temperature sensor 125 can be disposed in control unit 104, such as in the corrosion monitoring and conversion circuit 110. In some embodiments, e.g., as depicted in FIG. 3, the temperature sensor 125 can be disposed outside the corrosion monitoring and conversion circuit 110. The temperature detector circuit 136b can receive the signal from temperature sensor 125 and convert the sensor signal to a temperature value. In some embodiments, similar to the temperature sensor 120, the second temperature sensor 125 can be disposed in the corrosion monitoring sensor assembly 102 and arranged such that, while the temperature sensor 120 senses the temperature of the corrosive environment, e.g., inside the pipe 150, the second temperature sensor 125 senses the ambient temperature, e.g. outside the pipe 150. The temperature sensor 125 can be e.g., a thermocouple, RTD, or a thermistor (NTC or PTC). In some embodiments, the temperature sensor 125 is a 10K NTC thermistor. By sensing both the temperature of the environment of the equipment being monitored and the ambient temperature (e.g., the temperature inside and outside the pipe 150), the two temperatures can be read and compared by appropriate circuitry in corrosion monitoring and conversion circuit 110 or another device (e.g., monitoring platform 230) to predict potential problems in the equipment due to the temperature, e.g., whether and when any water will freeze. For example, the monitoring and conversion circuit 110 or another device (e.g., monitoring platform 230) can predict whether there will be a failure of pipe 150 (and thus the potential for a false trip of the fire suppression system) based on the temperature readings inside and/or outside the pipe 150. For example, as depicted in the flow diagram 300 in FIG. 5, in step 310, the temperature monitoring circuit 140 determines if the received equipment temperature ($T_E$) (e.g., temperature inside pipe 150) measured by temperature sensor 120 is below a predetermined temperature value $T_1$. If yes at step 310, the temperature monitoring circuit 140 determines if the received ambient temperature ($T_A$) from temperature sensor 125 is at or below $T_E$ at step 320. If yes at step 320, a freeze alert is issued by the temperature monitoring circuit 140 at step 330. The freeze alert can include a timestamp and the value of temperatures $T_E$ and $T_A$. The predetermined temperature value $T_1$ can be in a range from 30 deg. F. to 40 deg. F. The predetermined temperature value $T_1$ can depend on factors such as, e.g., the freezing point of the liquid in the piping system and the altitude of the piping system. A temperature value selected from near the lower range (e.g., at or below freezing such as 30 deg. F.) can provide a more reliable freeze alert but the time period to take action before the equipment freezes can be very short. A temperature value selected from near the upper range (e.g., well above freezing such as 40 deg. F.) will provide more time to take action but the freeze alert may not be as reliable as a lower value for $T_1$. If no at step 320, no action is taken by the temperature monitoring circuit 140.

If no at step 310, e.g., $T_E$ is above the predetermined temperature value, the temperature monitoring circuit 140 determines if the received temperature $T_A$ is at or below the freezing point for the liquid in the equipment being monitored, e.g., 32 deg. F., at step 340. If yes at step 340, a freeze alert is issued by the temperature monitoring circuit 140 at step 330. The freeze alert can include a timestamp and the value of temperatures $T_E$ and $T_A$. If no at step 340, no action is taken by the temperature monitoring circuit 140. When issued, the freeze alerts, timestamps, information related to the temperatures $T_E$ and $T_A$, including the temperature values and potential problems, can be transmitted to a remote client device, e.g., a client device such as mobile device 210 and/or stationary electronic device 215. In some embodiments, the performance of the steps in flow diagram 300 can be done in another device (e.g., monitoring platform 230) or shared between the corrosion monitoring and conversion circuit 110 and another device (e.g., monitoring platform 230). For example, one or more steps 310 to 340 can be performed by the corrosion monitoring and conversion circuit 110 and any remaining steps can be performed by the other device (e.g., monitoring platform 230). For example, monitoring platform 230 can perform the step 330 and issue the freeze alert to the user. The temperature monitoring circuit 140 can collect temperature data for the equipment temperature ($T_E$) measured by temperature sensor 120 and the ambient temperature ($T_A$) from temperature sensor 125 and the other device, e.g., monitoring platform 230, can be implemented using a cloud networking system and includes a computational engine to perform the freeze alert calculations and transmittals to the user.

The monitoring device 100 can include a water detection circuit 138 to sense the presence or absence of water in the pipe, e.g., in pipe 150. The water detection circuit 138 can use information derived from any two of the coupon portions 106a-106d to detect the water. For example, the monitoring and water detection circuit 138 can sense a conductance between any two coupon portions 106 to determine whether there is water present between the coupon portions 106a-106d. When there are more than two coupon portions 106 in sensor assembly 102, voltage can be used to sense whether there is conductance between the two thickest coupon portions 106. For example, a voltage signal can be provided to one end of the second thickest coupon portion 106 and one end of the thickest coupon portion 106 is checked for the voltage signal. A voltage signal will exist if the sensor assembly 102 is in water. In this way, if the thinnest coupon portions 106 corrode away, the two thickest coupon portions 106 will still be able to detect for water. The water detection circuit can include a voltage divider circuit that includes a reference resistor having a known resistance and the other "resistor" of the voltage divider circuit is the resistance of the current flow path between the two thickest coupons and the air and/or medium between them. For example, as depicted in FIG. 4, relay circuit 130 can include a voltage divider circuit 164 that can be used for determining the presence of water. The voltage divider circuit 164 includes relay K5, a voltage source providing voltage $V_{IN}$, and a reference resistor $R_{REF2}$ having a predetermined resistance. Reference resistor $R_{REF2}$ also serves as a pull-down resistor to keep the voltage $V_w$ from floating when the respective coupon portion 106 has corroded open and/or when relay K5 is de-energized. The relay K5 can be operated, e.g., by a microprocessor (not shown) or other circuit, which can be part of the monitoring and conversion circuit 110. The microprocessor or other circuit can be part of the relay circuit 130. At least two of the coupon portions 106 can be connected to the voltage divider circuit in relay circuit 130 when K5 is operated. As depicted in FIG. 4, coupon portions 106c and 106d, which can be the second thickest and thickest coupon portions, respectively, can be used for the detection of water. For example, when relay K5 is energized, a voltage $V_{IN}$ is applied to one end of coupon portion 106c via terminal K5-3 of relay contact K5A. A voltage $V_w$ can be read at one end of the coupon 106d via terminal K5-9 of contact K5B. The voltage $V_w$, which corresponds to the resistance between the two coupons, can be transmitted to and measured by water detection circuit 138. The water detection circuit 138 and/or an external device (e.g., monitoring platform 230) can read and compare the voltage $V_w$ readings to a predetermined value that corresponds to a presence or absence of water in the sensor assembly 102, e.g., between coupon portions 106c and 106d. Where the monitoring device 100 is installed in a piping system, the presence of water in a "dry-pipe" system or the absence of water in a "wet-pipe" system can indicate a problem in the piping system. An alert can be sent to a user when there is an indication that a problem exists in the piping system. The alert can be sent with a timestamp. The same monitoring device 100 can be used for both "wet-pipe" and "dry-pipe" systems. The orientation of the corrosion monitoring sensor assembly 102 in the piping system can be based on the type of system. For example, as depicted in FIG. 6A, for "dry-pipe" system, the corrosion monitoring sensor assembly 102 can be located at the bottom half of the pipe, such as near the bottom. For example, the sensor assembly 102 can be disposed at an angle α in a range of ±60 degrees, such as ±45 degrees, such as ±30 degrees, with zero degrees being the bottom of the pipe. For a dry-pipe system, the corrosion monitoring sensor assembly 102 can be mounted at an expected water-air boundary level that represents a water level at which a corrective action needs to be taken. For example, a small level of water in a dry-pipe system may not be a concern, but at some point the water level may reach a point where corrective action needs to be taken, e.g., checking for leaks in valves. For a "wet-pipe" system, as seen in FIG. 6B, the sensor assembly 102 can be located at the top half of the pipe, such as near the top. For example, the sensor assembly 102 can be disposed at an angle θ in a range of ±60 degrees, such as ±45 degrees, such as ±30 degrees, with zero degrees being the top of the pipe. The corrosion monitoring sensor assembly 102 can be mounted at an expected water-air boundary for the wet-pipe system and, for example, mounted sensing the water side of the water-air boundary. In either type of system, the sensor assembly 102 can be mounted onto a mechanical tee, an elbow tee, an endcap, or some other mounting assembly. The mounting can be adjustable so that the sensor assembly 102 can be moved relative to the pipe. For example, the sensor assembly 102 can be mounted onto a grooved mechanical tee or a grooved endcap so that the positon of the sensor assembly 102 can be adjusted relative to the pipe 150. An adjustable mounting allows for modifications to the mounting angle if system conditions change and/or the initial mounting angle was not correct, e.g., not correct with respect to the location of the water-air boundary.

If there are less than two coupon portions 106 that are good, the presence of water detection can be stopped until the sensor assembly 102 is replaced. However, if a coupon portion 106 has opened up, it can still be used for detecting the presence of water depending on how much of an open coupon portion 106 still exists. In this case a second coupon 106 is not needed to sense for water. For example, the water detection circuit 138 can use the open coupon portion to sense the conductance by transmitting a voltage signal at one end of the open coupon and checking for the voltage signal at the other end. A freeze alarm may be initiated only if water is detected and the temperature monitoring circuit 140 indicates that there is a chance the detected water can freeze. In this way, the freeze alarm can be not initiated when water is not detected to reduce nuisance alarms.

Figure 10:
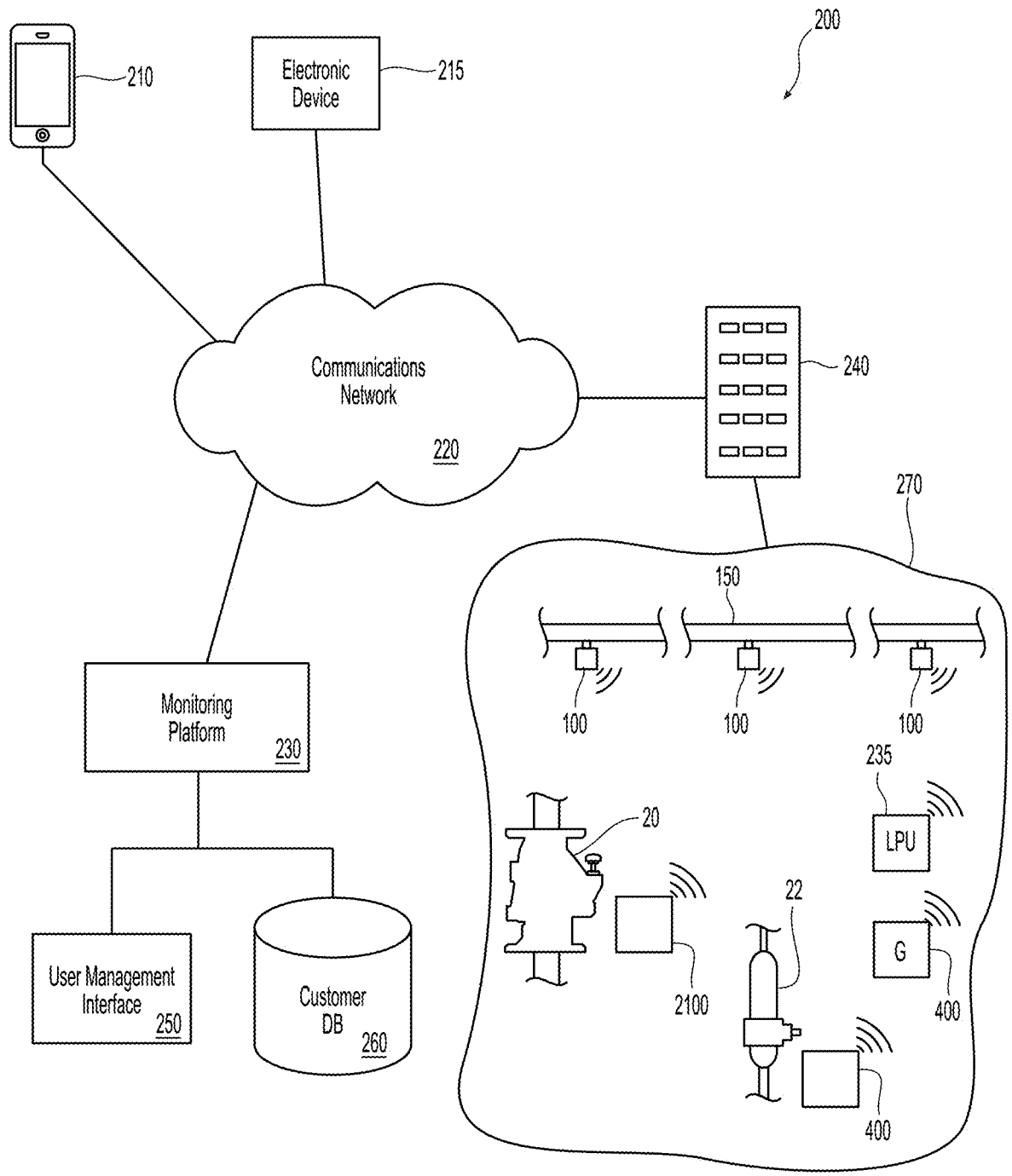
FIG. 10 is a flow diagram of a method of determining when low air pressure alert should be issued to be executed by a differential pressure detector circuit of an edge device.

As depicted in FIG. 3, the monitoring device 100 can include a transmission circuit 116 that includes a transmitter or transceiver for transmitting sensor values and/or information derived from the sensor values such as, for example, continuity readings, voltage readings, current readings, temperature readings (ambient and/or equipment environment), water freeze indications, inductance values, presence of water indication, resistance values, change in the resistance values, corrosion level values, corrosion rate values, timestamp values, and/or other sensor values and/or information to external devices (e.g., monitoring platform 230 —see FIG. 10) via, e.g., communication network 220 (see FIG. 10). In addition to the various values and information discussed above, the transmission circuit 116 can also transmit other information generated by the monitoring device 100 such as the status of the monitoring device 100 (e.g., on-line, off-line, working properly, not working, needs repair, and/or some other status value), status of the individual voltage, current, inductance, and/or temperature sensors (e.g., working, not working, value out of range, and/or some other information concerning the sensors), status of the wire loops (e.g., closed or open (broken) loop, expected life, or some other information concerning the wire loops), and/or some other information related to the readiness of monitoring device 100.

The transmission circuit 116 can use wired and/or wireless networks to communicate the values and/or information to the external devices. The transmission circuit 116 can use a wireless network to communicate the values and/or information to the external devices. The wireless network can have a range of up to 3 miles. In some embodiments, the transmission circuit 116 can transmit the values and/or information to a gateway (discussed further below) using the wireless network, and the gateway transmits the values and/or information using a cellular or IP-based network to the external devices via communications network 220. The transmission circuit 116 can use a LoRaWAN wireless network via a MultiConnect® xDot™ made by MultiTech. In some embodiments, the transmission circuit 116 can be configured to transmit the values and/or information over a period of time in batches.

The control unit 104 can include a power source 112. The power source 112 provides power to the monitoring and conversion circuit 110. The power source 112 can be a battery, such as a battery that is "off-the-shelf." In some embodiments, the battery can be a lithium ion battery (or batteries), which provides a long battery life. The battery can last 6 to 10 years without the need for replacement. The power source 112 can be monitored by a power monitoring circuit 112a that provides an alert or alarm if there is a problem with the power source 112. For example, if the power source 112 is a battery, the power source monitoring circuit 112a can provide an alert/alarm when the battery is low and/or needs to be replaced. In some embodiments, the battery is a rechargeable battery while in other embodiments the battery is replaced after it is discharged. In case of a rechargeable battery, the power to charge the battery in power source 112 can be supplied by a DC or AC bus connected to a utility grid and/or supplied by solar cells. In some embodiments, the battery of power source 112 is not field replaceable or rechargeable. In this case, the battery can be configured to last the expected life of the pipe 150 and/or the monitoring device 100 can be shipped to a service center for battery replacement. In some embodiments, the power source 112 converts power from an external source such as, for example, the DC or AC power bus, which can be connected to a plurality of edge devices.

In some embodiments, the corrosion monitoring and conversion circuit 110 can include local memory (e.g., machine-readable medium) to record and store one or more of reference values (e.g., $V_{IN}$, $V_{REF1}$, $V_{REF2}$), the measured sensor values and/or electrical characteristic values (e.g., $V_C$, $V_W$, other voltage values, current values, inductance values, continuity values, and/or temperature values), the calculated electrical characteristic values (e.g., re si stance), the calculated chance in electrical characteristic values, the calculated corrosion level/rate values, and/or other calculated and/or determined information. The corrosion monitoring and conversion circuit 110 can include look-up-tables, databases, equations, or some other data conversion method that includes information related to the correlations, as discussed above, between one or more of the following: resistance values, change in resistance values, coupon weight loss per area values, equipment weight loss per area values, and/or corrosion level/rate values. The corrosion monitoring and conversion circuit 110 can include look-up-tables, databases, equations, or some other data conversion method to make the correlation between the voltage values and the presence or absence of water determination, and to make the correlation between temperature values and the determination of potential problems for the equipment, e.g., a determination as to whether and when the water will freeze. An external device (e.g., monitoring platform 230) can include look-up-tables, databases, equations, or some other data conversion method to make the correlations as discussed above. The external device can also include memory (e.g., machine-readable medium) to record and store one or more of reference values (e.g., $V_{IN}$, $V_{REF1}$, $V_{REF2}$), the measured sensor values and/or electrical characteristic values (e.g., $V_C$, $V_W$, other voltage values, current values, inductance values, continuity values, and/or temperature values), the calculated electrical characteristic values (e.g., re si stance), the calculated chance in electrical characteristic values, the calculated corrosion level/rate values, and/or other calculated and/or determined information.

The corrosion monitoring, temperature monitoring, water detection monitoring and/or transmitting functions discussed above can be incorporated in to a one or more programmable microprocessors. For example, as depicted in FIG. 3, a microprocessor 145 can be programmed to perform the functions of the corrosion detector circuit 132, the corrosion rate circuit 134, the temperature monitor circuit 140, the water detector circuit 138, and/or the transmitter circuit 116. The programmable microprocessor can be an Advanced RISC Machines (ARM) processor such as, e.g, a MultiConnect® xDot™ that communicates over a LoRaWAN network. The programmable processor 145 can receive the temperature feedback signals from temperature detector 120 and/or temperature detector 125. The programmable processor 145 can then perform the functions of temperature monitoring circuit 140 (e.g., determining freeze alerts) as discussed above. In some embodiments, the relays K1-K4 are connected to and operated by the programmable processor 145, and the programmable processor 145 is configured to read the voltage signals from the corresponding relay contacts as discussed above. The programmable processor 145 can then perform the functions of the corrosion detector circuit 132 and/or the corrosion rate circuit 134 as discussed above. The programmable processor 145 can be connected to relay K5 and be configured to read the voltage signals from the relay contact. The programmable processor 145 can then perform the functions of the water detector circuit 138 as discussed above.

In some embodiments, the CM device 100 can continuously measure the coupon voltage values and the temperature values and/or continuously transmit the measured values. Depending on the type of system and the environment that the equipment is installed in, corrosion of the equipment to any significant degree may not be detected for years. In addition, even when the corrosion is detected, the progression of the corrosion may occur over months or years. In such cases, a constant drain on the power source 112 by continuously sending current through the wire loops 105 can be undesirable and considered a waste of energy and/or inefficient. Similarly, continuously checking the temperature or the presence of water may not be worth the cost to battery life. For example, if the temperatures are above freezing and/or fairly constant, a once a day check may be sufficient to protect the equipment. Accordingly, in some embodiments, the microprocessor 145 or one or more of the individual circuits in the corrosion monitoring and conversion circuit 110 (e.g., the corrosion detector circuit 132, the corrosion rate circuit 134, the temperature monitoring circuit 140, and/or the water detector circuit 138 is programmed to only take readings for a predetermined duration of time. The predetermined duration of time can range from a few seconds to a few minutes depending on the number of measurements that are required. For example, each corrosion related, temperature related, and/or water detection related measurement can be taken a predetermined number of times. When more than one measurement is taken, the measurements can be averaged. In addition to limiting the duration of time that the readings are taken, the time period between when the microprocessor 145 or the appropriate circuit takes the corrosion related, temperature related, and/or water detection related measurement can be based on a predetermined time period (e.g., every predetermined number of minutes, days, weeks, months, and/or years). The predetermined time periods for the respective measurements can be set independently. For example, the corrosion related and water detection measurements can be performed once a day while the temperature related measurements can be performed every minute. The time period between when the measurements are taken can be based on one or more of the following performance criteria: required battery life, remaining battery life, the level of corrosion, the rate of corrosion, the temperature of the equipment environment, the ambient temperature, the presence or absence of water, and/or some other performance criteria. For example, if the monitoring device 100 is required to be installed for a period of, e.g., 10 years, the microprocessor 145 or the appropriate circuit can be configured to take into account this factor when determining when and/or how often to take the measurements. The microprocessor 145 or the appropriate circuit can be configured to take the battery life (e.g., high/low, number of years remaining) as another factor to take into consideration. The rate of corrosion and the level of corrosion are also factors that can be used to determine when and/or how often to take the measurements. For example, at initial installation, when the rate of corrosion and/or the level of corrosion is expected to be low, the microprocessor 145 or circuit 132 and/or 134 can be configured such that the time period between when corrosion related measurements are relatively long initially and then gradually or periodically shortened as the rate and/or level of corrosion increases. In situations where the corrosion rate or level is not a primary concern but the temperature is a primary concern due to, e.g., water freezing concerns, the microprocessor 145 or circuit 140 can use the equipment environment temperature from temperature sensor 120 and/or ambient temperature from temperature sensor 125 as factors in determining how often to power up the circuits. In some embodiments, to prevent electrical interactions, e.g., unintended current flow, that can accelerate or decelerate the corrosion of the coupon portions 106, the relay circuit 130 breaks the connection, e.g., by opening the contacts on the relays K1-K5, between the wire loops 105 and the relevant circuits in monitoring and conversion circuit 110.

Operation of the transmission circuit 116 can be regulated in order to conserve power. In some embodiments, the values and/or information transmitted to and measured by the microprocessor 145 (or individually from the corrosion detector circuit 132, the corrosion rate circuit 134, the temperature monitor circuit 140, and/or the water detector circuit 138) can be transmitted by the transmitter 116 as respective measurements are being made. In some embodiments, the time period for transmission of the measured values and/or information is independent of the time period that the measurements are made. For example, the transmission circuit 116 can transmit values and/or status information once each day or some other predetermined time period regardless of when or how often the measurements are made. The measured values and/or status information can be transmitted responsive to detecting a change in the measured values. In some embodiments, the measured values and/or status information are transmitted only when the value changes by a predetermined amount or the status information changes. For example, the temperature readings from temperature sensors 120 and 125 can be transmitted by transmitter circuit 116 when they change by a predetermined amount such as, e.g., 2 deg. F. Similarly, the continuity status (open/closed) of a coupon portion 106 and/or the water presence status can be transmitted responsive to detecting that the respective status has changed (a coupon has open circuited (broken) or has open circuited out of sequence (e.g., a larger coupon has broken before a smaller coupon in which case an error status is transmitted), or the water presence status shows a change (e.g., from "wet" to "dry" or a change from "dry" to "wet").

FIGS. 7A, 7B, 7C, and 7D depict an LPM sensor assembly 1102 for the LPM device 1100. As depicted in FIGS. 7A-7D, LPM sensor assembly 1102 includes a plug insert 1143 and a housing 1144. The plug insert 1143 can be a separate component from housing 1144 and can be disposed in the housing 1144. The plug insert 1143 can be secured in the housing 1144 via a press fit or e.g., a threaded connection. In some embodiments, the plug insert 1143 and the housing 1144 are not separate components, e.g., plug insert 1143 and housing 1144 are an integral unit. The LPM sensor assembly 1102 can include at least one continuity probe 1105 that is disposed in the plug insert 1143, e.g., by press fit or another means of attachment. The continuity probe 1105 can be electrically isolated from the housing 1144 of the LPM sensor assembly 1102 and thus also isolated from the drum drip 22 when no water is present in the drum drip 22 and/or isolated from the pipe when no drum drip is used and water is present in the pipe. For brevity and clarity, various embodiments will be discussed with reference to drum drip 22 and a wall of drum drip 22. The LPM device 1100 is also applicable to a pipe and a wall of a pipe in a system where no drum drip is used in the low point piping. The continuity probe 1105 can be made of a conducting material such as e.g., a metal or metal alloy. The LPM sensor assembly 1102 can be configured such that an electrically conductive path is formed between a wall of the drum drip 22 and/or the housing 1144 and the continuity probe 1105 when there is water in the drum drip 22. In some embodiments, the LPM sensor assembly 1102 includes a second continuity probe and the electrical path is formed between the two continuity probes rather than the continuity probe 1105 and the wall/housing 1144. The two-probe arrangement can be used where the housing 1144 is not composed of a metal and/or where continuity readings between the probe and the wall of the drum drip 22 are unreliable, e.g., due scale or corrosion buildup in the piping system 50. The end of the continuity probe 1105 can be attached, e.g., by soldering, threaded screw, or another means of attachment, to a wire lead that is then routed to the LPM monitoring and conversion circuit 1110. In some embodiments, the LPM monitoring and conversion circuit 1110 can include a pipe temperature sensor 1120 and/or an ambient temperature sensor 1125 in combination with the LPM sensor assembly 1102.

The plug insert 1143 of the LPM sensor assembly 1102 can have a low electrical conductivity and/or a low thermal conductivity. The plug insert 1143 can be made of a plastic. In some embodiments, the plug insert 1143 is composed of a thermoset material, such as a thermoset material that is in compliance with the Underwriter Laboratories (UL) standards concerning fire suppression systems. For example, the plug insert 1143 can be composed of a silicon material, urethane material, another type of thermoset material, or any combination thereof. In some embodiments, the plug insert 1143 is made of a thermoplastic such as an acrylonitrile butadiene styrene (ABS) plastic. The composition of the plug insert 1143 can be made of a metal or metal alloy, a thermoset plastic, a thermoplastic, a ceramic, or a combination thereof, as appropriate, so long as the continuity probe 1105 is isolated from the housing 1144 or from the other probes in a multi-probe embodiment. The plug insert 1143 and/or the housing 1144 can be made of a material that is rated to at least 250 deg. F. The housing 1144 can be in the shape of a pipe plug with treads 1146, such as in the shape of a standard threaded pipe plug. For example, the housing 1144 can be in the shape of a 1 inch National Pipe Thread (NPT) threaded pipe plug (or some other standard pipe plug size) with a head portion 1147 that is hexagonal in shape or some other shape that facilitates installation using a tool (e.g., a hex socket). The housing 1144, including head portion 1147, can have various shapes as appropriate for the equipment being monitored. The composition of the housing 1144 can be made of a metal or metal alloy, a thermoset plastic, a thermoplastic, a ceramic, or a combination thereof, as appropriate. In some embodiments, the housing 1144 and the plug insert 143 are an integrated unit. The integrated housing 1144 and plug inset 1143 can be injection molded. The composition of the integrated housing 1144/plug insert 1143 can be made of a metal or metal alloy, a thermoset plastic, a thermoplastic, a ceramic, or a combination thereof, as appropriate. The housing 1144 can be rated for the same or higher pressures and temperatures as the equipment being monitored. The housing 1144 can be rated at 2 to 3 times the operating pressure of the equipment being monitored. In the case of piping systems for fire sprinklers, the equipment can operate from 150 psi to 175 psi, and the housing 1144 can be rated is a range from 300 psi to 525 psi. For example, in a typical piping system for fire sprinkler systems, the threaded pipe plug can be rated up to 400 psi. The pressure rating can depend on the application and, in some embodiments, the housing 1144 can be a pipe plug that is rated up to 1600 psi and, in some embodiments, up to 3000 psi.

Figure 8:
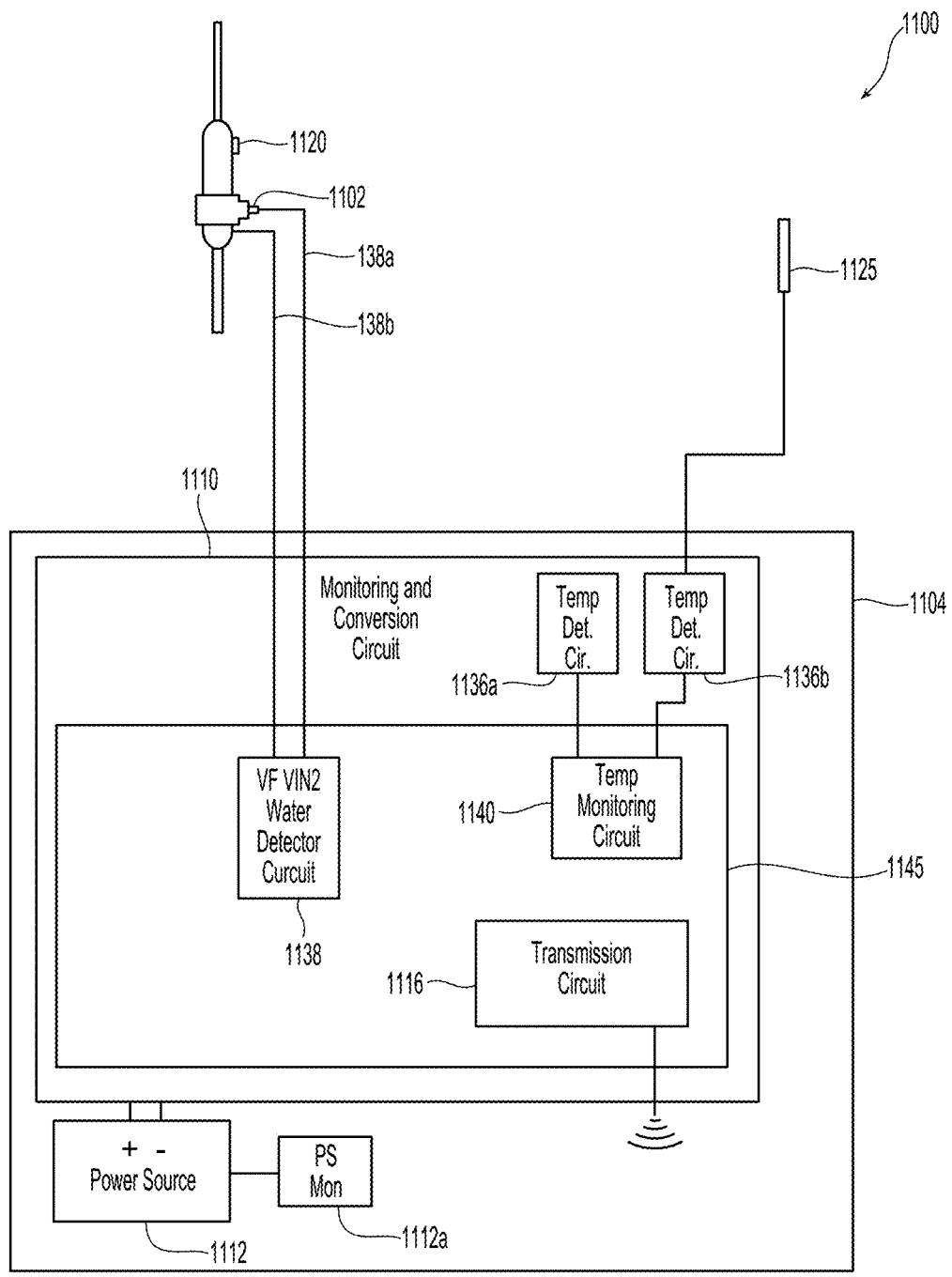
FIG. 8 is a block schematic view of a low point monitoring device.

FIG. 8 depicts a schematic block diagram of an LPM device 1100. The LPM device 1100 includes a LPM sensor assembly 1102 with continuity probe 1105 and/or temperature sensors 1120, 1125 and a control unit 1104 that monitors the LPM sensor assembly 1102. As depicted in FIG. 8, the control unit 1104 can include a LPM monitoring and conversion circuit 1110. The LPM monitoring and conversion circuit 1110 can monitor the conductivity between the conductivity probe 1105 and the wall of drum drip 22/housing 1144 (or the conductivity between two probes) and determines whether there is water in the drum drip 22.

The LPM monitoring and conversion circuit 1110 can include a water detection circuit 1138 to sense the presence or absence of water in the pipe of drum drip 22. The water detection circuit 1138 can use information derived from the continuity probe 1105 to detect the water. For example, the water detection circuit 1138 can sense a conductance between the continuity probe 1105 and the wall of the drum drip 22 and/or the housing 1144 by measuring an electrical signal between the continuity probe 1105 and the wall and/or housing 1144 (or measuring an electrical signal between two continuity probes). In systems that do not have a drum drip, the conductance between the continuity probe 1105 and a wall of the pipe can be measured. The electrical signal can be a voltage, a current, a resistance, an inductance or some other electrical signal. A voltage can be used to sense whether there is conductance. For example, a voltage signal $V_{IN2}$ can be provided to an external end of the continuity probe 1105 via a wire lead 138*a* connected to, e.g., a screw disposed on the external end of the continuity probe 1105, and a voltage feedback signal $V_F$ can be read by the water detection circuit 1138 via a wire lead 138*b* connected to the wall of drum drip 22. The voltage signal $V_{IN2}$ can be a predetermined voltage signal, such as a voltage signal in a range of 2-10 volts, such as 3 volts ±10%. The water detection circuit 1138 can read the voltage feedback signal $V_F$ from the pipe if the LPM sensor assembly 1102 is in water. Some feedback voltage can exist even when the drum drip 22 has no water in it, due to leakage current paths from the pipe (or housing 1144) to the continuity probe 1105. The leakage current paths can exist due to dirt, scale, corrosion build up or for some other reason. To prevent false water detection readings, the voltage feedback signal $V_F$ can be compared to a threshold valve $V_{TH}$ to determine if water is present in the drum drip 22. If the water in the drum drip 22 has 100% conductivity the voltage feedback signal $V_F$ will equal $V_{IN2}$. Because water is not 100% conductive, the feedback signal can be 85% to 95% of $V_{IN2}$ when the drum drip 22 is full of water, e.g., a ratio of $V_F/V_{IN2}$ is in a range of 85% to 95%, and the threshold value $V_{TH}$ can be set to a value in a range from 85% to 95% of $V_{IN2}$, and such as 90% of $V_{IN2}$. The threshold value $V_{TH}$ can be different depending on the system. If the ratio is greater than or equal to the threshold value $V_{TH}$, the water detection circuit 1138 can determine that water is present in the drum drip 22. If the ratio is below the threshold value $V_{TH}$, the water detection circuit 1138 can determine that no water is present in the drum drip 22. To prevent the input voltage to the water detection circuit 1138 from floating, a pull-down resistor circuit similar to those discussed above can be used at the input terminal of $V_F$. The calculations to determine if water is present in the drum drip 22 can be done in a remote device, e.g., a server on a cloud network. For example, monitoring platform 230 can include a computational engine to perform the water detection calculations discussed above.

As depicted in FIG. 8, the LPM monitoring device 1100 can include a temperature sensor 1120. The temperature sensor 1120 can be disposed on the external wall of drum drip 22 or pipe, and the temperature sensor 1120 senses the surface temperature of the drum drip 22 or pipe. By placing the temperature sensor 1120 on the drum drip 22 or pipe, the temperature measurement will experience a delay due to the mass of the drum drip 22 or the pipe wall in comparison to an ambient temperature reading. The delay provides a more accurate indication with respect to when freezing could potentially could occur. The temperature sensor 1120 can be disposed inside the pipe, e.g., by disposed in LPM sensor assembly 1102 in a manner similar to CM sensor assembly 102 and temperature sensor 120 discussed above. The LPM monitoring and conversion circuit 1110 can include temperature detector circuit 1136*a* that receives the signal from temperature sensor 1120 and converts the sensor signal to a temperature value. The temperature sensor 1120 can be, e.g., a thermocouple, RTD, or a thermistor (NTC or PTC). In some embodiments, the temperature sensor 1120 is a 10K NTC thermistor. The temperature value from sensor 1120 can be read by appropriate circuitry in monitoring and conversion circuit 1110 or another device (e.g., monitoring platform 230) to predict potential problems due to the temperature, e.g., problems such as whether and when any water in the drum drip 22 will freeze.

In some embodiments, a second temperature sensor 1125 senses the ambient temperature outside the drum drip 22. For example, the temperature sensor 1125 senses the temperature of the ambient air surrounding the pipe of drum drip 22. The temperature sensor 1125 can be disposed in control unit 1104, such as in the LPM monitoring and conversion circuit 1110. In some embodiments, e.g., as depicted in FIG. 8, the temperature sensor 1125 is disposed outside the LPM monitoring and conversion circuit 1110. The temperature detector circuit 1136*b* can receive the signal from temperature sensor 1125 and converts the sensor signal to a temperature value. The temperature sensor 1125 can be, e.g., a thermocouple, RTD, or a thermistor (NTC or PTC). In some embodiments, the temperature sensor 1125 is a 10K NTC thermistor. By sensing both the temperature of the pipe if drum drip 22 and the ambient temperature surrounding the drum drip 22, the two temperatures can be read and compared by appropriate circuitry in LPM monitoring and conversion circuit 1110 or another device (e.g., monitoring platform 230) to predict potential problems in the equipment due to the temperature, e.g., whether and when any water will freeze. For example, the LPM monitoring and conversion circuit 1110 or another device (e.g., monitoring platform 230) can predict whether there will be a failure of a pipe in the fire protection system (and thus the potential for a false trip of the fire suppression system) based on the temperature readings. For example, the LPM monitoring and conversion circuit 1110 and/or another device (e.g., monitoring platform 230) can implement the logic described in flow diagram 300, as discussed above. The temperature sensor 1120 can be mounted on the drum drip 22 or on the pipe instead of being disposed inside the drum drip 22 or inside the pipe. The temperature sensor 1120 can be disposed in the LPM sensor assembly 1102 similar to temperature sensor 120 and CM sensor assembly 102 to measure the temperature inside the drum drip 22 or inside the pipe. The temperature detecting circuit of LPM monitoring and conversion circuit 1110 and/or another device (e.g., monitoring platform 230) can be coordinated with the water detection circuit 1138 such that a water freeze alarm is initiated only if water is detected and the temperature circuit indicates that there is a chance the detected water can freeze. In this way, the water freeze alarm is not initiated when water is not detected to reduce nuisance alarms. In some embodiments, LPM monitoring and conversion circuit 1110 or another device (e.g., monitoring platform 230) can provide a high temperature alarm based on the temperature sensor 1120 and/or temperature sensor 1125 being at or above a respective predetermined high temperature value.

If the LPM monitoring and conversion circuit 1110 or another device (e.g., monitoring platform 230) detects water and/or a water freeze condition, an alarm can be initiated to indicate there is a potential problem in the piping system 50 that can cause a false trip. Once an alarm has been initiated, the operator can take remedial action to prevent the false trip such as, e.g., draining water from the low point. For example, the operator can close the inlet valve to the drum drip 22 and open the outlet valve to drain the water. After the water is drained, the outlet valve of drum drip 22 is closed and the inlet valve is opened. The DPM device 2100 (or another device such as, e.g., monitoring platform 230) can automatically drain the water, e.g., as described above, to prevent or lessen the chances of a false trip. For example, the inlet and outlet valves of drum drip 22 can be motor or solenoid operated valves (or some other type of automated valves) and the LPM water detector circuit 1138 (or some other circuit) can be configured to control the inlet and outlet valves of drum drip 22 to drain the water in the low point before it freezes and causes a rupture in the piping system 50. In some embodiments, the remedial action that is taken (either manually by the operator or automatically by the LPM monitoring and conversion circuit 1110 or by another device (e.g., monitoring platform 230)) to prevent the false trip is placing the fire suppression system off-line until the problem is corrected.

As depicted in FIG. 8, the LPM monitoring device 1100 can include a transmission circuit 1116 that includes a transmitter or transceiver for transmitting sensor values and/or information derived from the sensor values (such as, for example, continuity readings, voltage readings, temperature readings (ambient and/or equipment environment), water freeze indications, presence of water indication, and/or other sensor values and/or information) to external devices (e.g., monitoring platform 230) via, e.g., communication network 220. In addition to the various values and information discussed above, the transmission circuit 1116 can also transmit other information generated by the LPM monitoring device 1100 such as the status of the LPM monitoring device 1100 (e.g., on-line, off-line, working properly, not working, needs repair, and/or some other status value), status of the individual voltage and/or temperature sensors (e.g., working, not working, value out of range, and/or some other information concerning the sensors), and/or some other information related to the readiness of monitoring device 1100.

The transmission circuit 1116 can use wired and/or wireless networks to communicate the values and/or information to the external devices. The transmission circuit 1116 can use a wireless network to communicate the values and/or information to the external devices. The wireless network can have a range of up to 3 miles. In some embodiments, the transmission circuit 1116 can transmit the values and/or information to a gateway (discussed further below) using the wireless network, and the gateway transmits the values and/or information using a cellular or IP-based network to the external devices via communications network 220. The transmission circuit 1116 can use a LoRaWAN wireless network via a MultiConnect® xDot™ made by MultiTech.

In some embodiments, the transmission circuit 1116 transmits the values and/or information over a period of time in batches.

The control unit 1104 can include a power source 1112. The power source 1112 can provide power to the LPM monitoring and conversion circuit 1110. The power source 1112 can be a battery, such as a battery that is "off-the-shelf." In some embodiments, the battery can be a lithium ion battery (or batteries), which provides a long battery life. The battery can last 6 to 10 years without the need for replacement. The power source 1112 can be monitored by a power monitoring circuit 1112a that provides an alert or alarm if there is a problem with the power source 1112. For example, if the power source 1112 is a battery, the power source monitoring circuit 1112a can provide an alert/alarm when the battery is low and/or needs to be replaced. In some embodiments, the battery is a rechargeable battery. The battery can be replaced after it is discharged. In case of a rechargeable battery, the power to charge the battery in power source 1112 can be supplied by a DC or AC bus connected to a utility grid and/or supplied by solar cells. In some embodiments, the battery of power source 1112 is not field replaceable or rechargeable. In this case, the battery can be configured to last the expected life of the piping system 50 and/or the LPM monitoring device 1100 can be shipped to a service center for battery replacement. The power source 1112 can convert power from an external source such as, for example, the DC or AC power bus, which can be connected to a plurality of edge devices.

In some embodiments, the LPM monitoring and conversion circuit 1110 can include local memory (e.g., machine-readable medium) to record and store one or more of reference values (e.g., $V_{IN2}$, $V_{TH}$), the measured sensor values (e.g., $V_F$, other voltage values, continuity values, and/or temperature values), the calculated values (e.g., temperature, water presence), and/or other calculated and/or determined information. The LPM monitoring and conversion circuit 1110 can include look-up-tables, databases, equations, or some other data conversion method to make the correlation between the voltage feedback values and the presence or absence of water determination, and to make the correlation between temperature values and the determination of potential problems for the equipment, e.g., a determination as to whether and when the water will freeze. An external device (e.g., monitoring platform 230) can include look-up-tables, databases, equations, or some other data conversion method to make the correlations as discussed above. The external device can include memory (e.g., machine-readable medium) to record and store one or more of reference values (e.g., $V_{IN2}$, $V_{TH}$), the measured sensor values (e.g., $V_F$, other voltage values, current values, continuity values, and/or temperature values), the calculated values (e.g., temperature, water presence), and/or other calculated and/or determined information.

The temperature monitoring, water detection monitoring and/or transmitting functions discussed above can be incorporated in to a one or more programmable microprocessors. For example, as depicted in FIG. 8, a microprocessor 1145 can be programmed to perform the functions of the temperature monitor circuit 1140, the water detector circuit 1138, and/or the transmitter circuit 1116. The programmable microprocessor is an Advanced RISC Machines (ARM) processor such as, e.g., a MultiConnect® xDot™ that communicates over a LoRaWAN network. The programmable processor 1145 can receive the temperature feedback signals from temperature detector 1120 and/or temperature detector 1125. The programmable processor 1145 can then perform the functions of temperature monitoring circuit 1140 (e.g., determining freeze alerts) as discussed above. In some embodiments, the programmable processor 1145 can provide the voltage signal $V_{IN2}$ and read the voltage feedback signal $V_F$ from the pipe of drum drip 22. The programmable processor 1145 can then perform the functions of the water detector circuit 1138 as discussed above.

In some embodiments, the LPM monitoring device 1100 can continuously measure the voltage feedback signal $V_F$ for the presence of water. A constant drain on the power by continuously checking for the presence of water can be undesirable and considered a waste of energy and/or inefficient. Continuously checking the temperature may not be worth the cost to battery life. For example, if the temperatures are above freezing and/or fairly constant, a once a day check may be sufficient. Accordingly, in some embodiments, the microprocessor 1145 or one or more of the individual circuits in the LPM monitoring and conversion circuit 1110 (e.g., the temperature monitoring circuit 1140, and/or the water detector circuit 1138) can take readings for a predetermined duration of time. The predetermined duration of time can range from a few seconds to a few minutes depending on the number of measurements that are required. For example, each temperature related, and/or water detection related measurement can be taken a predetermined number of times. When more than one measurement is taken, the measurements are averaged. In addition to limiting the duration of time that the readings are taken, the time period between when the microprocessor 145 or the appropriate circuit takes the temperature related and/or water detection related measurement can be based on a predetermined time period (e.g., every predetermined number of minutes, days, weeks, months, and/or years). The predetermined time periods for the respective measurements can be set independently. For example, the water detection related measurements and/or the temperature related measurements can be performed once per minute. The time period between when the measurements are taken can be based on one or more of the following performance criteria: required battery life, remaining battery life, the temperature of the equipment environment, the ambient temperature, the presence or absence of water, and/or some other performance criteria. For example, if the LPM monitoring device 1100 is required to be installed for a period of, e.g., 10 years, the microprocessor 1145 or the appropriate circuit can be configured to take into account this factor when determining when and/or how often to take the measurements. The microprocessor 1145 or the appropriate circuit can be configured to take the battery life (e.g., high/low, number of years remaining) as another factor to take into consideration.

Operation of the transmission circuit 1116 can be regulated to conserve power. In some embodiments, the values and/or information transmitted to and measured by the microprocessor 1145 (or individually from the temperature monitor circuit 1140 and/or the water detector circuit 1138) can be transmitted by the transmitter 1116 as respective measurements are being made. In some embodiments, the time period for transmission of the measured values and/or information is independent of the time period that the measurements are made. For example, the transmission circuit 1116 can transmit values and/or status information once each day or some other predetermined time period regardless of when or how often the measurements are made. The measured values and/or status information can be transmitted responsive to detecting a change in the measured values. For example, the water detection status can be transmitted when there is a change in the status, e.g., from no water detected to water detected or from water detected to no water detected. In some embodiments, the measured values and/or status information are transmitted only when the value changes by a predetermined amount. For example, the temperature readings from temperature sensors 1120 and 1125 can be transmitted by transmitter circuit 1116 when they change by a predetermined amount such as, e.g., 2 deg. F.

The LPM device 1100 can monitor a drum drip or other sections of the piping system.

Figure 9:
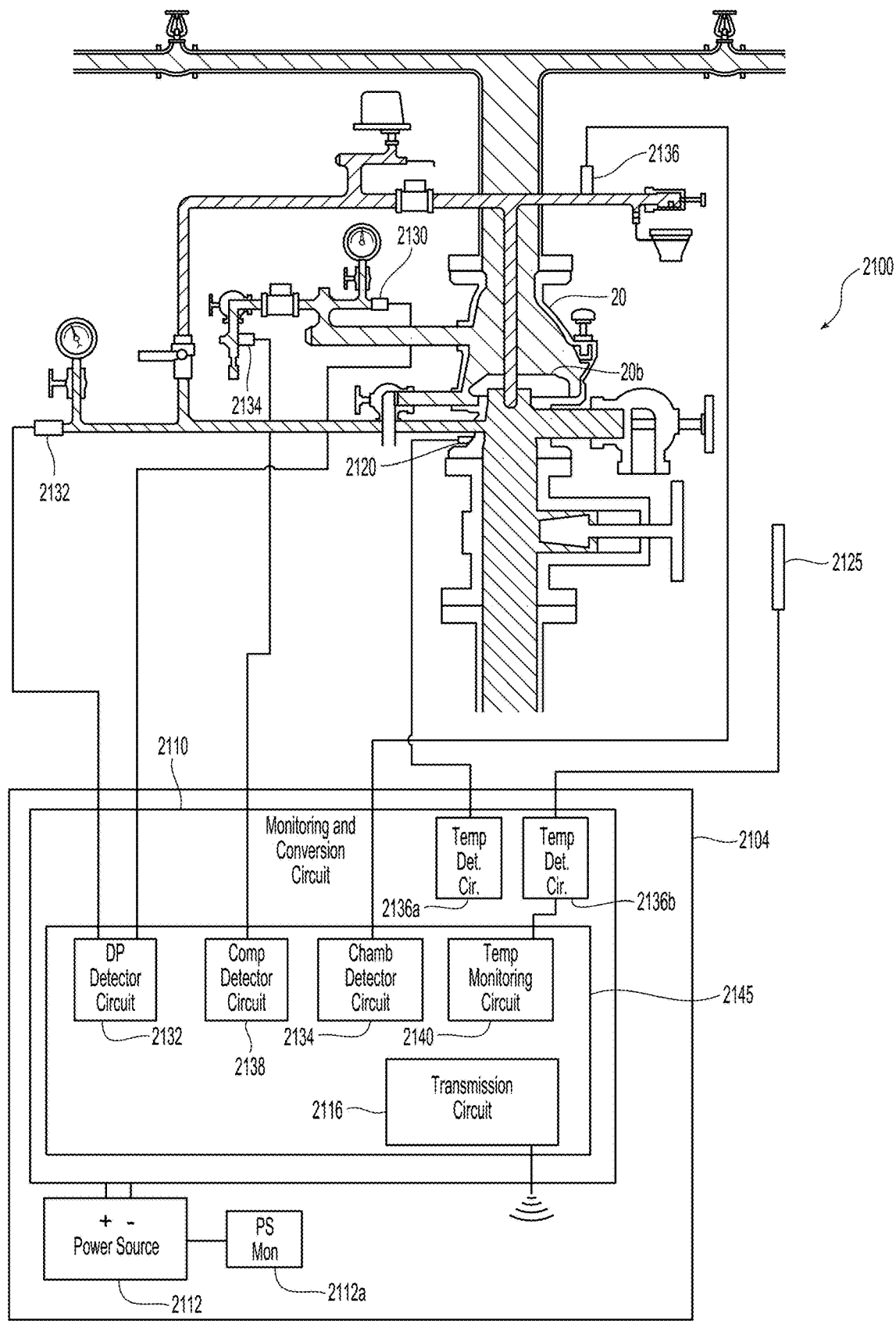
FIG. 9 is a block schematic view of a dry pipe valve differential pressure monitoring device.

FIG. 9 illustrates a schematic block diagram of a DPM device 2100. As discussed above, due to water and/or air pressure fluctuations, false trips of the fire suppression system can occur without an alarm or an alert that the air pressure is insufficient to keep the valve closed. The DPM device 2100 can include a pressure sensor 2132 that senses the water pressure at the bottom of the clapper 20*b* of the dry pipe valve 20 and a pressure sensor 2130 that senses the air pressure on the top of the clapper 20*b* when the valve is in a ready state. The DPM device 2100 also includes a DPM control unit 2104 that monitors the pressure sensors 2130 and 2132. The DPM control unit 2104 can include a DPM monitoring and conversion circuit 2110 that provides a dynamic low air pressure alarm based on the monitored pressure sensors 2130 and 2132.

For example, as depicted in FIG. 9, the DPM monitoring and conversion circuit 2110 can include differential pressure (DP) detector circuit 2132 that reads the air pressure value $P_{AIR}$ from pressure sensor 2130 and compares the value $P_{AIR}$ to a threshold value that corresponds to the minimum required air pressure (MRAP) for the design valve trip ratio (VTR) of the dry pipe valve. The MRAP value can change dynamically based on the water pressure value $P_W$ from pressure sensor 2132. If the air pressure value $P_{AIR}$ is below the MRAP value, the system can output an alarm and/or an alert can be sent to a user to indicate the potential for an inadvertent operation (e.g., false trip) of the fire suppression system because the air pressure on top of clapper 20*b* may not be enough to keep the dry pipe valve 20 closed against the inlet water pressure $P_W$. The MRAP can dynamically compensate for changes in water pressure to provide an updated MRAP value based on the design VTR of the dry pipe valve 20. The MRAP value can be based on a buffer safety factor BufferPress in addition to the design VTR. The MRAP can be equal to (($P_W$/VTR)+BufferPress). The MRAP calculation can be performed by the DP detector circuit 2132. For example, the DP detector circuit 2132 can receive the water pressure $P_W$ from pressure sensor 2132. The water pressure value is divided by the design VTR of dry pipe valve 20 in circuit 2132. For example, the design VTR of dry pipe valve 20 can be 5.5. The VTR can have various values depending on the configuration of the dry pipe valve. The resultant value from this division can be the minimum air pressure value to keep the dry pipe valve 20 closed. The DP detector circuit 2132 can add a buffer air pressure value BufferPress to the calculated minimum required air pressure value to determine the MRAP for the dry pipe valve 20. The buffer air pressure value BufferPress can act as a safety factor to ensure that the clapper 20*b* will remain closed. BufferPress can be a value in a range from 0 to 15 psi, such as 5 to 10 psi, such as 10 psi.

FIG. 10 depicts a flow diagram 2200 of a method of dynamically determining the MRAP value and determining an unstable condition in the fire suppression system 10. In step 2210, the water pressure $P_W$ is read from pressure sensor 2132. In step 2220, the MRAP is calculated. The water pressure value $P_W$ can be divided by the design VTR of dry pipe valve 20 and a safety factor BufferPress can be added to the resultant value to determine the MRAP. The safety factor BufferPress can ensure that the clapper will remain closed due to minor fluctuations in water rand air pressures. In step 2230, the air pressure $P_{AIR}$ is read from pressure sensor 2130. In step 2240, the air pressure value $P_{AIR}$ is compared to the MRAP value. If the air pressure value is lower than the MRAP value, then in step 2250 a low air pressure alarm is initiated and sent to the user or customer to indicate the potential for an inadvertent operation dry pipe valve 20 (e.g., false trip) due to a lack of differential pressure. If the air pressure is at or above the MRAP value, the process goes back to step 2210. The DP detector circuit 2132 can provide an alarm if the fire suppression system 10 trips due to the $P_{AIR}$ dropping below the MRAP whether the trip was due to a false condition or a valid condition in the system 10. In some embodiments, the DP detector circuit 2132 (or another circuit) can provide a low air pressure alarm based on $P_{AIR}$ being at or below a predetermined low air pressure value and/or a high air pressure alarm based on $P_{AIR}$ being at or above a high air pressure alarm. In some embodiments, the DP detector circuit 2132 (or another circuit) can provide a low water pressure alarm based on $P_W$ being at or below a predetermined low water pressure value and/or a high water pressure alarm based on $P_W$ being at or above a high air pressure alarm. In some embodiments, some or all of the calculations and alerts performed by DP detector circuit 2132 are performed by an external device (e.g., monitoring platform 230).

As described above, systems and methods of the present disclosure can create a low air pressure alarm threshold that dynamically changes to water supply fluctuations in real time. For example, the MRAP value can be updated in real-time by constantly monitoring the system water supply pressure $P_W$ and dynamically modifying the old MRAP valve as conditions change. As compared to some systems that use a fixed air pressure alarm threshold, systems and methods of the present disclosure can alert the user or customer that the fire suppression system is potentially in an unstable condition (e.g., can initiate a false trip) due to changes in the water supply pressure. These unstable conditions can go unnoticed in some systems.

Once an alarm has been initiated, the operator can take remedial action to prevent the false trip such as, e.g., adjusting the air pressure higher and/or the water pressure lower to prevent a false trip. The DPM device 2100 (or another device such as, e.g., monitoring platform 230) can automatically provide the remedial action by adjusting the air pressure and/or the water pressure to prevent or lessen the chances of a false trip. For example, the DP detector circuit 2132 (or some other circuit) can control devices (not shown) that regulate the air pressure in piping system 50 at the outlet of the dry pipe valve 20 and/or the water pressure at the inlet to the dry pipe valve 20. In some embodiments, the remedial action that is taken (either manually by the operator or automatically by the DPM device 2100 or by another device (e.g., monitoring platform 230)) to prevent the false trip is placing the fire suppression system off-line until the problem is corrected.

As depicted in FIG. 9, the DPM device 2100 can include a pressure sensor 2134 to sense the supply air pressure from the source, e.g., a tank and/or a compressor. The DPM monitoring and control circuit 2110 can include a compressor air detector circuit 2138 that receives the compressor air pressure $P_c$ from pressure sensor 2134. The compressor pressure $P_c$ can be compared to a predetermined value or values by the compressor air detector circuit 2138 to provides alerts if the compressor pressure $P_c$ is at or above a predetermined high compressor pressure and/or at or below a predetermined low compressor air pressure. A compressor air pressure value $P_c$ that is below the predetermined low compressor air pressure value can indicate the potential for an inadvertent operation (e.g., false trip) of the dry pipe valve 20. For example, if the compressor air is not able to replenish the air that keeps clapper 20b closed (e.g., due to leaks in the piping system 50), the dry pipe valve 20 could eventually trip. Monitoring the compressor air pressure value $P_c$ can provide advance warning of such a problem. Once an alarm has been initiated, the remedial action can be taken either manually by the operator or automatically by compressor air detector circuit 2138 or by another device (e.g., monitoring platform 230) to prevent the false trip, such as, e.g., placing the fire suppression system off-line until the problem is corrected. In some embodiments, some or all of the calculations and alerts performed by compressor air detector circuit 2138 are performed by an external device (e.g., monitoring platform 230).

As depicted in FIG. 9, the DPM device 2100 can include a pressure sensor 2136 to sense the intermediate chamber air pressure in dry pipe valve 20. The intermediate chamber in a dry pipe valve is a cavity between on the underside of the clapper 20b. The intermediate chamber is formed when the clapper 20b seals against the valve seat. The intermediate chamber has a passage to the atmosphere and the passage is connected to a water motor alarm (not shown) and/or a water pressure alarm 24 as depicted in FIG. 1. The intermediate chamber pressure in the clapper type valve depicted in FIG. 1 is typically zero (e.g., at atmospheric pressure) when the fire suppression system in the ready state. Leaks can occur around the clapper 20b such that the differential pressure between the air side and the water side of the clapper 20b is lost and the dry pipe valve 20 will inadvertently open, e.g., a false trip of the fire suppression system will occur. The DPM monitoring and conversion circuit 2110 can include a valve chamber pressure detector circuit 2142 that reads a pressure value $P_{CH}$ from the pressure sensor 2136. The intermediate chamber pressure $P_{CH}$ can be compared to a predetermined intermediate chamber air pressure value or values by the valve chamber pressure detector circuit 2142 to provides alerts if the intermediate chamber pressure $P_{CH}$ is too high. A $P_{CH}$ value that is above the predetermined value can indicate the potential for an inadvertent operation (e.g., false trip) of the fire suppression system because the differential pressure across the clapper 20b may not be enough to keep the dry pipe valve closed. Once an alarm has been initiated, the operator can execute remedial action to prevent the false trip such as, e.g., adjusting the air pressure higher and/or the water pressure lower to prevent a false trip. The DPM device 2100 (or another device such as, e.g., monitoring platform 230) can automatically provide the remedial action by adjusting the air pressure and/or the water pressure to prevent or lessen the chances of a false trip. In some embodiments, the remedial action that is taken (either manually by the operator or automatically by the DPM device 2100 or by another device (e.g., monitoring platform 230)) to prevent the false trip is placing the fire suppression system off-line until the problem is corrected. In some embodiments, some or all of the calculations and alerts performed by valve chamber pressure detector circuit 2142 are performed by an external device (e.g., monitoring platform 230).

As depicted in FIG. 9, the DPM device 2100 can include a temperature sensor 2120. The temperature sensor 2120 can be disposed on the dry pipe valve 20 on the inlet water side and senses the surface temperature of the dry pipe valve 20. The temperature sensor 2120 can be disposed inside the dry pipe valve 20 similar to temperature sensor 120 discussed above. The DPM monitoring and conversion circuit 2110 can include a temperature detector circuit 2136*a* that receives the signal from temperature sensor 2120 and converts the sensor signal to a temperature value. The temperature sensor 2120 can e.g., a thermocouple, RTD, or a thermistor (NTC or PTC). The temperature sensor 2120 can be a 10K NTC thermistor. The temperature value from sensor 2120 can be read by appropriate circuitry in DPM monitoring and conversion circuit 2110 or another device (e.g., monitoring platform 230) to predict potential problems due to the temperature, e.g., problems such as whether and when any water in the dry pipe valve 20 will freeze.

In some embodiments, a second temperature sensor 2125 senses the ambient temperature outside the dry pipe valve 20. For example, the temperature sensor 2125 can sense the temperature of the ambient air surrounding the dry pipe valve 20. The temperature sensor 2125 can be disposed in control unit 2104, such as in the DPM monitoring and conversion circuit 2110. In some embodiments, e.g., as depicted in FIG. 9, the temperature sensor 2125 is disposed outside the DPM monitoring and conversion circuit 2110. The temperature detector circuit 2136*b* can receive the signal from temperature sensor 2125 and convert the sensor signal to a temperature value. The temperature sensor 2125 can be e.g., a thermocouple, RTD, or a thermistor (NTC or PTC). In some embodiments, the temperature sensor 2125 is a 10K NTC thermistor. By sensing both the temperature of the dry pipe valve 20 and the ambient temperature surrounding the dry pipe valve 20, the two temperatures can be read and compared by appropriate circuitry in DPM monitoring and conversion circuit 2110 or another device (e.g., monitoring platform 230) to predict potential problems in the dry pipe valve 20 due to the temperature, e.g., whether and when any water will freeze. For example, the DPM monitoring and conversion circuit 2110 or another device (e.g., monitoring platform 230) can predict whether there will be a failure of dry pipe valve 20 (and thus the potential for a false trip of the fire suppression system) based on the temperature readings of the dry pipe valve 20 and/or the ambient temperature outside the dry pipe valve 20. For example, the monitoring and conversion circuit 2110 and/or another device (e.g., monitoring platform 230) can implement the logic described in flow diagram 300, as discussed above. The temperature sensor 2120 can be mounted on the pipe instead of being disposed inside the pipe. The temperature sensor 2120 can be disposed in a sensor assembly similar to temperature sensor 120 and CM sensor assembly 102 to measure the temperature inside the inside the pipe. In some embodiments, DPM monitoring and conversion circuit 2110 or another device (e.g., monitoring platform 230) can be configured to provide a high temperature alarm based on the temperature sensor 2120 and/or temperature sensor 2125 being at or above a respective predetermined high temperature value. A high temperature value can alert the user of a potential false trip due to the temperature of the water increasing the water pressure $P_W$ to a point where a trip can occur.

As depicted in FIG. 9, the DPM device 2100 can include a transmission circuit 2116 that includes a transmitter or transceiver for transmitting sensor values and/or information derived from the sensor values (such as, for example, pressure readings, temperature readings (ambient and/or equipment environment), water freeze indications, and/or other sensor values and/or information) to external devices (e.g., monitoring platform 230) via, e.g., communication network 220. In addition to the various values and information discussed above, the transmission circuit 2116 can also transmit other information generated by the DPM device 2100 such as the status of the DPM device 2100 (e.g., on-line, off-line, working properly, not working, needs repair, and/or some other status value), status of the individual pressure and/or temperature sensors (e.g., working, not working, value out of range, and/or some other information concerning the sensors), and/or some other information related to the readiness of DPM device 2100.

The transmission circuit 2116 can use wired and/or wireless networks to communicate the values and/or information to the external devices. The transmission circuit 2116 can use a wireless network to communicate the values and/or information to the external devices. The wireless network can have a range of up to 3 miles. In some embodiments, the transmission circuit 2116 can transmit the values and/or information to a gateway (discussed further below) using the wireless network, and the gateway transmits the values and/or information using a cellular or IP-based network to the external devices via communications network 220. The transmission circuit 2116 can use a LoRaWAN wireless network via a MultiConnect® xDot™ made by MultiTech. In some embodiments, the transmission circuit 2116 can be configured to transmit the values and/or information over a period of time in batches.

The control unit 2104 can include a power source 2112. The power source 2112 can provide power to the DPM monitoring and conversion circuit 2110. The power source 2112 can be a battery, such as a battery that is "off-the-shelf." In some embodiments, the battery can be a lithium ion battery (or batteries), which provides a long battery life. The battery can last 6 to 10 years without the need for replacement. The power source 2112 can be monitored by a power monitoring circuit 2112*a* that provides an alert or alarm if there is a problem with the power source 2112. For example, if the power source 2112 is a battery, the power source monitoring circuit 2112*a* can provide an alert/alarm when the battery is low and/or needs to be replaced. In some embodiments, the battery is a rechargeable battery. The battery can be replaced after it is discharged. In case of a rechargeable battery, the power to charge the battery in power source 2112 can be supplied by a DC or AC bus connected to a utility grid and/or supplied by solar cells. In some embodiments, the battery of power source 2112 is not field replaceable or rechargeable. In this case, the battery can be configured to last the expected life of the fire suppression system and/or the DPM device 2100 can be shipped to a service center for battery replacement. The power source 2112 can convert power from an external source such as, for example, the DC or AC power bus, which can be connected to a plurality of edge devices.

In some embodiments, the DPM monitoring and conversion circuit 2110 can include local memory (e.g., machine-readable medium) to record and store one or more of reference values (e.g., VTR, BufferPress, other threshold values), the measured sensor values (e.g., $P_{AIR}$, $P_W$, $P_C$, $P_{CH}$, and/or temperature values), the calculated values (e.g., MRAP, other threshold values, temperatures), and/or other calculated and/or determined information. The DPM monitoring and conversion circuit 2110 can include look-up-tables, databases, equations, or some other data conversion method to make the correlation between the pressure values and the threshold values and to make the correlation between temperature values and the determination of potential problems for the equipment, e.g., a determination as to whether and when the water will freeze. An external device (e.g., monitoring platform 230) can include look-up-tables, databases, equations, or some other data conversion method to make the correlations as discussed above. The external device can include memory (e.g., machine-readable medium) to record and store one or more of reference values (e.g., VTR, BufferPress, other threshold values), the measured sensor values (e.g., $P_{AIR}$, $P_W$, $P_C$, $P_{CH}$, and/or temperature values), the calculated values (e.g., MRAP, other threshold values, temperatures), and/or other calculated and/or determined information.

The pressure monitoring, threshold conversions, temperature monitoring, and/or transmitting functions discussed above can be incorporated in to a one or more programmable microprocessors. For example, as depicted in FIG. 9, a microprocessor 2145 can be programmed to perform the functions of the temperature monitor circuit 2140, the differential pressure detector circuit 2132, the compressor air detector circuit 2138, the valve chamber pressure detector circuit 2142, and/or the transmitter circuit 2116. The programmable microprocessor can be an Advanced RISC Machines (ARM) processor such as, e.g., a MultiConnect® xDot™ that communicates over a LoRaWAN network. The programmable processor 2145 can receive the temperature feedback signals from temperature detector 2120 and/or temperature detector 2125. The programmable processor 2145 can then perform the functions of temperature monitoring circuit 2140 (e.g., determining freeze alerts) as discussed above. In some embodiments, the programmable processor 2145 can be configured to read the pressure signals $P_{AIR}$, $P_W$, $P_C$, and/or $P_{CH}$ from the fire suppression system 10. The programmable processor 2145 can then perform the functions of the differential pressure detector circuit 2132, the compressor air detector circuit 2138, and the valve chamber pressure detector circuit 2142 as discussed above.

In some embodiments, the DPM device 2100 can be configured to continuously measure the pressure signals $P_{AIR}$, $P_W$, $P_C$, and/or $P_{CH}$ from the fire suppression system 10. A constant drain on the power by continuously checking for the pressures can be undesirable and considered a waste of energy and/or inefficient. Continuously checking the temperature signals may not be worth the cost to battery life. For example, if the temperatures are above freezing and/or fairly constant, a once a day check may be sufficient. The microprocessor 2145 or one or more of the individual circuits in the DPM monitoring and conversion circuit 2110 (e.g., the temperature monitoring circuit 2140, the differential pressure detector circuit 2132, the compressor air detector circuit 2138, and/or the valve chamber pressure detector circuit 2142) can be programmed to take readings for a predetermined duration of time. The predetermined duration of time can range from a few seconds to a few minutes depending on the number of measurements that are required. For example, each temperature related, and/or pressure related measurement can be taken a predetermined number of times. When more than one measurement is taken, the measurements are averaged. In addition to limiting the duration of time that the readings are taken, the time period between when the microprocessor 2145 or the appropriate circuit takes the temperature related and/or pressure related measurements can be based on a predetermined time period (e.g., every predetermined number of minutes, days, weeks, months, and/or years). The predetermined time periods for the respective measurements can be set independently. For example, the pressure related measurements and/or the temperature related measurements can be performed once per minute. The time period between when the measurements are taken can be based on one or more of the following performance criteria: required battery life, remaining battery life, the temperature of the dry pipe valve 20, the ambient temperature, and/or some other performance criteria. For example, if the DPM device 2100 is to be installed for a period of, e.g., 10 years, the microprocessor 2145 or the appropriate circuit can be configured to take into account this factor when determining when and/or how often to take the measurements. The microprocessor 2145 or the appropriate circuit can be configured to take the battery life (e.g., high/low, number of years remaining) as another factor to take into consideration.

Operation of the transmission circuit 2116 can be regulated to conserve power. In some embodiments, the values and/or information transmitted to and measured by the microprocessor 2145 (or individually from the temperature monitor circuit 2140, the differential pressure detector circuit 2132, the compressor air detector circuit 2138, and/or the valve chamber pressure detector circuit 2142) can be transmitted by the transmitter 2116 as respective measurements are being made. In some embodiments, the time period for transmission of the measured values and/or information is independent of the time period that the measurements are made. For example, the transmission circuit 2116 can transmit values and/or status information once each day or some other predetermined time period regardless of when or how often the measurements are made. The measured values and/or status information can be transmitted when there is a change in the measured values. For example, the measured values and/or status information can be transmitted when the value changes by a predetermined amount or the status information changes. For example, the temperature readings from temperature sensors 2120 and 2125 can be transmitted by transmitter circuit 2116 when they change by a predetermined amount such as, e.g., 2 deg. F, and/or the pressure readings are transmitted when they change by a predetermined amount such as, e.g., 1 psi.

Figure 11:
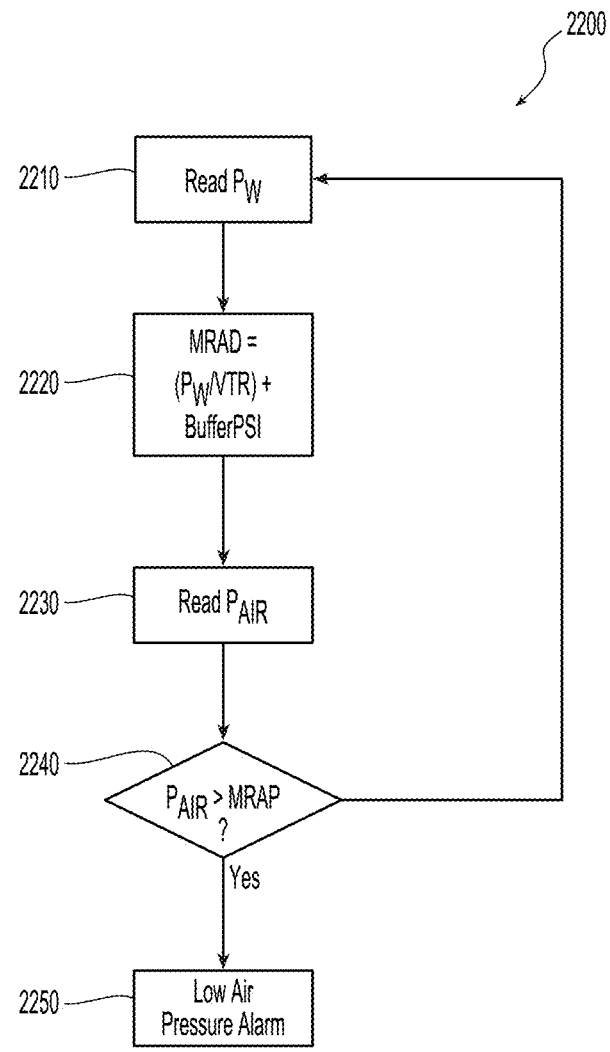
FIG. 11 is an example of an operating environment in which an edge device can be utilized.

FIG. 11 depicts an example of operating environment 200 that may include one or more mobile devices 210 (e.g., a mobile phone, tablet computer, mobile media device, mobile gaming device, vehicle-based computer, wearable computing device, portable computer, or other portable communication device), stationary electronic device 215 (e.g., desktop computers, servers, mainframes, or another type of non-portable electronic device), communications network 220, monitoring platform 230 (e.g., running on one or more remote servers or mainframes), monitoring system 270 (including one or more edge devices, local processing unit 235, and/or gateway unit 400) located in a building 240, user management interface 250, and a customer database 260. The end user can monitor, e.g., by means of an app on the mobile device 210 and/or the stationary electronic device 215, the edge devices discussed above, including the corrosion monitoring device 100 which monitors the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water; the low point monitoring device 1100 which monitors for the presence of water, the temperature of the pipe, and/or the ambient temperature surrounding the pipe; and the differential pressure device 2100 which monitors the water pressure at the inlet of the dry pipe valve, air pressure at the outlet of the dry pipe valve, compressor air pressure, intermediate chamber air pressure, the temperature of the dry pipe valve, and/or the ambient temperature surrounding the dry pipe valve. For example, the data and/or information from the edge devices and/or the monitoring platform 230 be displayed, e.g., on a system specific dashboard, for easy viewing of current data, historic data, and real-time status of system health. The display can be a web browser-based application and/or another type of application on the mobile device 210 and/or the stationary electronic device 215.

Information such as sensor values, the status of the monitoring system 270 (e.g., on-line, off-line, working properly, not working, needs repair, and/or some other status value), status of the individual voltage, current, inductance, continuity, pressure, and/or temperature sensors (e.g., working, not working, value out of range, and/or some other information concerning the sensors), status of the corrosion sensors (e.g., closed or open (broken), expected life, or some other information concerning the corrosion sensors), and/or some other information related to the readiness of monitoring system 270 can be transmitted to the mobile device 210 and/or electronic device 215. The mobile device 210 and/or electronic device 215 can provide alerts, predicted maintenance times, predicted failures, predicted inadvertent trips of the fire suppression system (i.e., false trips), and/or other information that shows the status of the edge devices, the fire suppression system 10, and/or the monitoring system 270.

Mobile devices 210, stationary electronic device 215 and the monitoring system 270 can include network communication components that enable communication with remote hosting servers or mainframes (e.g., monitoring platform 230), other stationary computers and servers, or other portable electronic devices by transmitting and receiving wireless signals using licensed, semi-licensed or unlicensed spectrum over communications network 220. In some embodiments, communications network 220 may comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 220 can also include third-party communications networks such as a LoRaWAN network, a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network. In some embodiments, communication network is a cloud-based network. For example, monitoring platform 230 can be a cloud-based backend server that includes the computational engines to calculate the corrosion, freeze alerts, temperature alarms, air and/or water pressure alarms, and/or water presence calculations discussed above.

Mobile devices 210 may execute network communication. For example, a mobile device 210 may be configured to communicate over a GSM mobile telecommunications network. As a result, the mobile device 210 or components of the corrosion monitoring system 270 may include a Subscriber Identity Module (SIM) card that stores an International Mobile Subscriber Identity (IMSI) number that is used to identify the mobile device 210 on the GSM mobile communications network or other networks, for example, those employing 3G and/or 4G wireless protocols. If the mobile device 210, stationary electronic device 215 or monitoring system 270 is configured to communicate over another communications network, the mobile device 210, stationary electronic device 215 or components of the monitoring system 270 may include other components that enable it to be identified on the other communications networks.

In some embodiments, mobile devices 210, stationary electronic device 215 or components of the monitoring system 270 in building 240 may include components that enable them to connect to a communications network using Generic Access Network (GAN) or Unlicensed Mobile Access (UMA) standards and protocols. For example, a mobile device 210 and/or electronic device 215 may include components that support Internet Protocol (IP)-based communication over a Wireless Local Area Network (WLAN) and components that enable communication with the telecommunications network over the IP-based WLAN. Mobile devices 210, stationary electronic device 215 or components of the monitoring system 270 may include one or more mobile applications that need to transfer data or check-in with monitoring platform 230.

In some embodiments, monitoring platform 230 can be configured to receive signals regarding the state of one or more monitoring systems 270. The signals can indicate the current status of a variety of system components. For example, in accordance with some embodiments, the signals can include information related to the level and rate of corrosion; the thickness of the pipe walls; air and/or water pressures in the valve, piping system, and compressor; the temperatures of a pipe and/or valve in the piping system; the ambient temperature outside the pipe and/or valve; and/or the presence or absence of water in the pipe and/or valve. In addition, monitoring platform 230 can be configured to receive signals related to other information such as sensor values; the status of the monitoring system 270 (e.g., on-line, off-line, working properly, not working, needs repair, and/or some other status value); status of the individual voltage, current, inductance, continuity, pressure, and/or temperature sensors (e.g., working, not working, value out of range, and/or some other information concerning the sensors); status of the corrosion sensors (e.g., closed or open (broken) loop, expected life, or some other information concerning the corrosion sensors); and/or some other information related to the readiness of the edge devices and/or monitoring system 270. The monitoring platform 230 can also be configured to provide alerts, predicted maintenance times, predicted failures, predicted inadvertent trips of the fire suppression system (i.e., false trips), and/or other information that shows the status of the edge devices, the fire suppression system 10, and/or the monitoring system 270 in the building 240 to external devices such as, e.g., mobile device 210 and/or stationary electronic device 215. In some embodiments, the monitoring platform 230 is a cloud-based backend server that includes the computational engines to calculate the corrosion, freeze alerts, temperature alarms, air and/or water pressure alarms, and/or water presence calculations discussed above.

Monitoring platform 230 can provide a centralized reporting platform for companies having multiple properties with monitoring systems 270. For example, a hotel chain or restaurant chain may desire to monitor piping systems in multiple properties via monitoring platform 230. This information can be stored in a database in one or more monitoring system profiles. Each of the monitoring system profiles can include a location of a monitoring system 270, a monitoring system identifier, a list of components of the monitoring system 270, a list of sensors available on the monitoring system 270, current and historical state information (including information related to the sensors, the level/rate of corrosion, the temperature of the water, ambient temperatures, air and water pressures, presence or absence of water, and/or status of the monitoring system 270, etc.), contact information (e.g., phone numbers, mailing addresses, etc.), maintenance logs, and other information. By recording the maintenance logs, for example, monitoring platform 230 can create certifiable maintenance records to third parties (e.g., insurance companies, fire marshals, etc.) which can be stored in customer database 260.

The monitoring system 270 in building 240 can include a local processing unit 235 that communicates with one or more edge devices. Local processing unit 235 can be configured to receive the sensor values and/or other information, as discussed above, from one or more of the edge devices and transmit the sensor values and/or other information to monitoring platform 230 via, e.g., communications network 220. In some embodiments, local processing unit 235 can directly communicate the sensor values and/or other information from one or more edge devices to monitoring platform 230. The monitoring system 270 in building 240 can include a gateway 400 that can communicate with one or more local processing units 235 and the local processing unit 235 can transmit the sensor values and/or other information from one or more monitoring devices 100 to the gateway unit 400. The monitoring system 270 in building 240 may not include a local processing unit 235, but includes a gateway 400 that can be configured to directly receive the sensor values and/or other information from the one or more edge devices via the transmission circuit in each of the edge devices, e.g., via a LoRaWAN wireless network. The gateway unit 400, upon receiving the signal values, can then transmit (e.g., using a cellular or IP-based network) the sensor values and/or other information from one or more edge devices to the monitoring platform 230 (or other device) via communications network 220. The monitoring platform 230 (or other device) can be a cloud-based server or device.

In some embodiments, the edge devices can include local memory to record information over a period of time. Then, local processing unit 235 and/or gateway 400 can transmit the information in batches to the monitoring platform 230. These transmissions may be prescheduled (e.g., every ten minutes, every hour, once a day, etc.), event triggered, and/or coordinate with respective edge devices. As one example, the system may send more frequent transmissions based on the type of piping system (wet or dry), based on the temperature of the pipe and/or valve in the system 10, the ambient temperature outside the pipe and/or valve, water and/or air pressures, the presence or absence of water, the corrosion level value, the corrosion rate value, and/or some other criteria. The information recorded by the monitoring device 100 can be, e.g., information related to the sensor values (e.g., voltage, current, temperature, inductance, continuity, pressure, or some other sensor value); information related to the level of corrosion and rate of corrosion; information related to the thickness of the pipe walls; information related to the temperature of the pipe and/or valve in the system 10; information related to the ambient temperature outside the pipe and/or valve; information related to water and air pressures; information related to the presence or absence of water in the system; and/or information related to the status of the edge devices, including status of sensors, (e.g., closed or open (broken) coupons, on-line, off-line, working properly, not working, needs repair, and/or some other status value).

Figure 12:
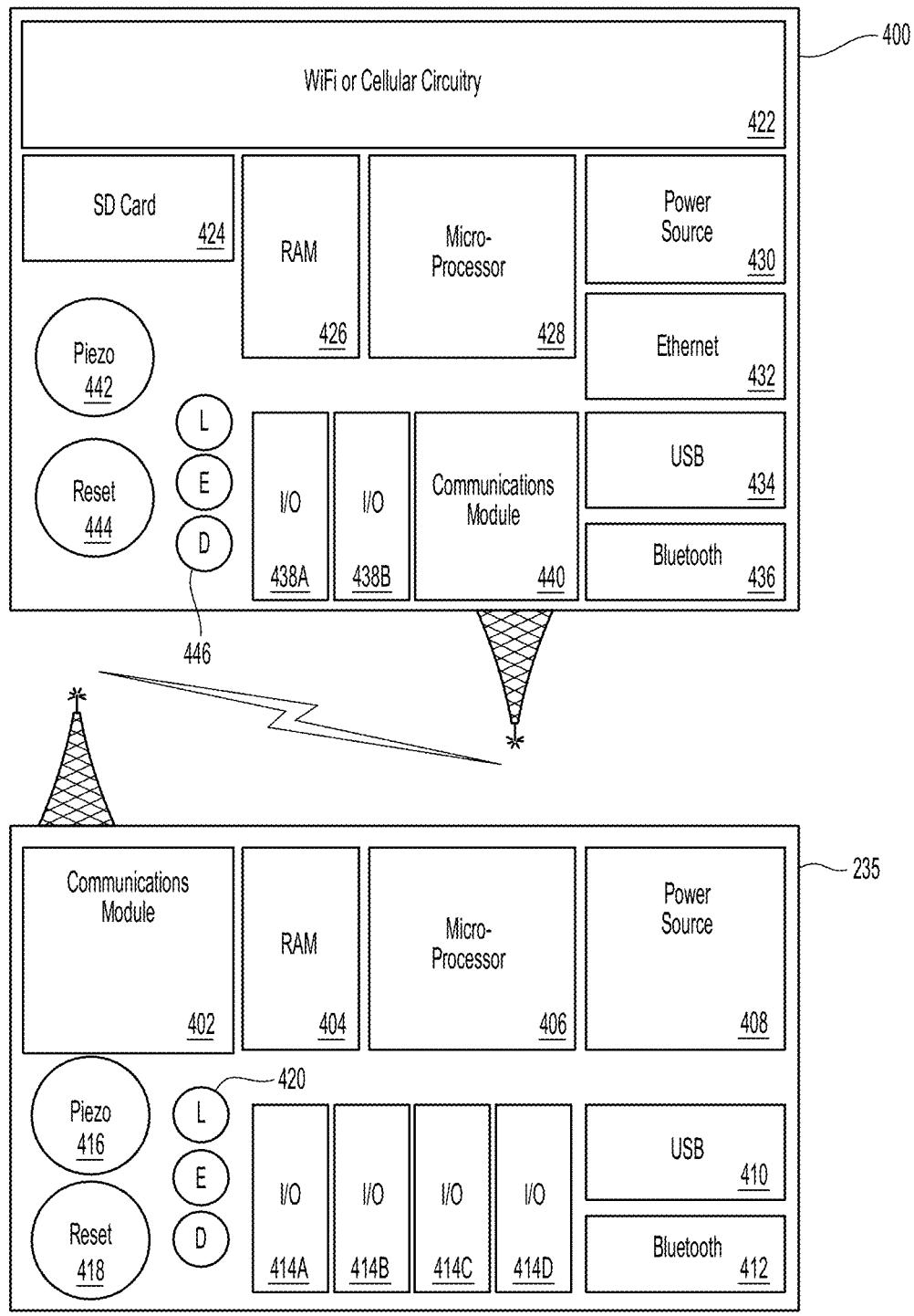
FIG. 12 is a schematic diagram of a set of components within a local processing unit associated with a corrosion monitoring system and a gateway unit capable of receiving transmissions from one or more local processing units.

FIG. 12 depicts local processing unit 235 associated with one or more monitoring devices 100 and a gateway unit 400 capable of receiving transmissions from one or more local processing units 235. Local processing unit 235 and gateway unit 400 can be low-power, microprocessor-based devices focused solely on a particular application. These units may include processing units, memories, I/O capabilities, audible and visual signaling devices, and external communications capabilities. For example, local processing unit 235 can include communications module 402, RAM 404, microprocessor 406, power source 408, USB 410, Bluetooth 412, I/O's 414A-414D, piezo 416 for providing a local audible alarm, reset 418 for resetting the alarm, and LEDs 420. Local processing unit 235 can communicate (e.g., wirelessly) with one or more monitoring devices 100 and other devices monitoring the piping system in building 240. The local processing unit 235 can be configured to directly receive the sensor values and/or other information from the one or more edge devices via the transmission circuit in each edge device, e.g., via a LoRaWAN wireless network. Similarly, gateway unit 400 can include Wi-Fi or cellular circuitry 422, SD card 424, RAM 426, microprocessor 428, power source 430, Ethernet 432, USB 434, Bluetooth 436, I/O's 438A-438B, communications module 440, piezo 442 for providing a local audible alarm, reset 444 for resetting the alarm, and/or LEDs 446. When gateway unit 400 includes cellular circuitry, in some embodiments, a SIM card that stores an IMSI number is used to identify the gateway unit 400 on a GSM mobile communications network or other networks, for example, those employing 3G and/or 4G wireless protocols.

Microprocessors 406 and 428 can have unique identifiers (IDs) programmed or set at the manufacturing level. The unique IDs can be used to link or associate local processing unit 235 and/or gateway unit 400 with customers, particular monitoring systems 270, physical sites, and/or other information. Owners and system service providers can be notified, e.g., via mobile device 210 and/or stationary electronic device 215, of the level of corrosion, the rate of corrosion, the thickness of the pipe walls, water and air pressures in the system, the temperature of the pipes and/or valves in the system, the ambient temperature outside the pipes and/or valves in the system, the presence or absence of water, sensor values, the status of the monitoring system 270, the status of an edge device, (e.g., on-line, off-line, working properly, not working, needs repair, and/or some other status value), status of the individual voltage, current, inductance, continuity, pressure, and/or temperature sensors (e.g., working, not working, value out of range, and/or some other information concerning the sensors), status of the corrosion sensors (e.g., closed or open (broken) loop, expected life, or some other information concerning the corrosion sensors), and/or some other information related to the readiness of monitoring system 270. Owners and system service providers can be notified, e.g., via mobile device 210 and/or stationary electronic device 215, of alerts, predicted maintenance times, predicted failures, predicted inadvertent trips of the fire suppression system (e.g., false trips), and/or other information that shows the status of the piping system, and/or the monitoring system 270. User profiles enable the end user to define his or her type or types of notification and when they occur (any time versus specific times). Accordingly, the notification capabilities are not solely limited to alarm or alert notifications. The system is capable of identifying maintenance activity and/or normal states, and the system can be configured to notify end users, technicians and customers of the states.

I/Os 414A-414D can be simple contact closure with a mechanical option to connect a switch to the normally open or normally closed terminals. This can help accommodate a variety of system configurations and may result in less field programming. Audible and visual warnings can be local (within the vicinity of the monitored system). For example, visual indicators may be board-based LED's 420, and audible would be a buzzer or piezo 416. Other embodiments may also include dry or wet contacts to provide binary alarm, warning, supervisory, trouble or other alerts to secondary fire, security, building automation or like systems on site.

Local processing unit 235 and/or gateway unit 400 can have a variety of external communications. In some embodiments, these components can support serial or USB communications so that the device can be programmed, configured or interrogated. A local Ethernet port 432 (supporting POE) may also be available in some embodiments. Additional communications options may include the ability to add a daughter board for Wi-Fi or Cellular connectivity. The local processing unit and/or gateway 400 can be configured to communicate over a LoRaWAN wireless network. This component can allow all data and events local to the system to a centralized server (e.g., monitoring platform 230).

Figure 13:
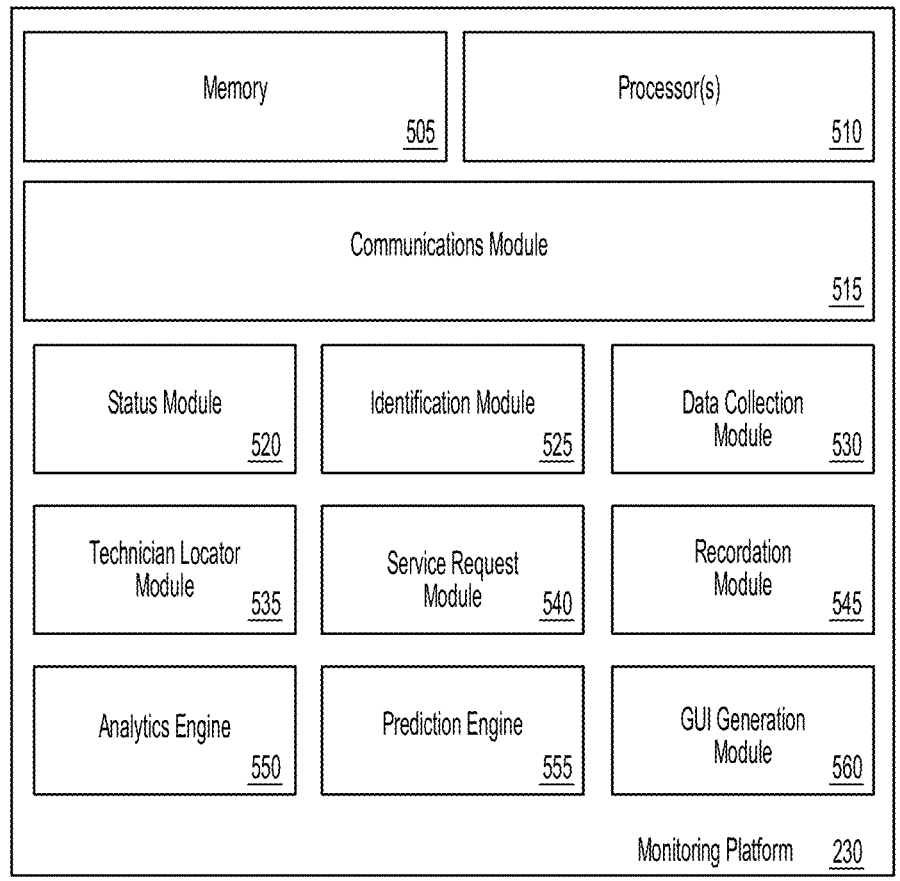
FIG. 13 is a schematic diagram of a set of components within a monitoring platform.

FIG. 13 depicts a set of components 500 within a monitoring platform 230. According to the embodiments shown in FIG. 12, monitoring platform 230 can include memory 505, one or more processors 510, communications module 515, status module 520, identification module 525, data collection module 530, technician locator module 535, service request module 540, recordation module 545, analytics engine 550, prediction engine 555, and graphical user interface (GUI) generation module 560. Each of these modules can be embodied as special-purpose hardware (e.g., one or more ARMs, ASICS, PLDs, FPGAs, or the like), or as programmable circuitry (e.g., one or more microprocessors, microcontrollers, or the like) appropriately programmed with software and/or firmware, or as a combination of special-purpose hardware and programmable circuitry. Components 500 can be combined in various combinations. Status module 520 and identification module 525 can be combined into a single module for determining the status of one or more corrosion monitoring systems 270.

Memory 505 can be any device, mechanism, or populated data structure used for storing information. In accordance with some embodiments of the present technology, memory 505 can encompass any type of, but is not limited to, volatile memory, nonvolatile memory and dynamic memory. For example, memory 505 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Memory 505 may be used to store instructions for running one or more applications or modules on processor(s) 510. For example, memory 505 could be used in one or more embodiments to house all or some of the instructions needed to execute the functionality of communications module 515, status module 520, identification module 525, data collection module 530, technician locator module 535, service request module 540, recordation module 545, analytics engine 550, prediction engine 555 and/or GUI generation module 560. While not shown in FIG. 13, in some embodiments, an operating system can be used to provide a software package that is capable of managing the hardware resources of monitoring platform 230. The operating system can also provide common services for software applications running on processor(s) 510.

Communications module 515 can be configured to manage and translate any requests from external devices (e.g., mobile devices 210, electronic device 215 corrosion monitoring systems 270, etc.) or from graphical user interfaces into a format needed by the destination component and/or system. Similarly, communications module 515 may be used to communicate between the system, modules, databases, or other components of monitoring platform 230 that use different communication protocols, data formats, or messaging routines. For example, in some embodiments, communications module 515 can receive measurements of the current state of one or more monitoring systems 270. Communications module 515 can be used to transmit status reports, alerts, logs, and other information to various devices.

Status module 520 can determine the status of the equipment being monitored, e.g., piping systems, corresponding to one or more corrosion monitoring systems 270. For example, status module 520 may use communications module 515 to directly request a status of equipment monitored by a monitoring system 270 from one or more gateways 400 or local processing units 235. Identification module 525 can be configured to receive sensor data and/or other information, as discussed above, generated by the monitoring system 270, e.g., sensor data and information generated by monitoring devices 100. Using the received sensor data and/or other information, identification module 525 can then identify an operational status of the equipment being monitored by the monitoring system 270, e.g., a piping system. The operational status and/or the sensor data itself can then be recorded within a monitoring profile in a database for the monitored equipment. As a result, the monitoring profile can provide a history of the operational status of the equipment monitored by the monitoring system 270 over time. In accordance with some embodiments, the operational status can include a functional status indicating that the equipment monitored by the monitoring system 270 should operate as expected, a maintenance status indicating when the monitored equipment should undergo maintenance and/or inspection, and an inoperative status indicating that the monitored equipment may not operate as expected.

Data received via communications module 515 can be accessed by data collection module 530 for processing, formatting, and storage. Data collection module 530 can keep track of the last communication from each of the corrosion monitoring systems 270 and generate an alert if any edge device fails to report on schedule (e.g., every minute, every five minutes, or other preset schedule) and/or when a request is made. Data collection module 530 can also review the quality of the data received and identify any potential issues. For example, if a data set from a monitoring system 270 includes various sensor data, data collection module 530 can analyze the data to determine any erratic behavior or outliers that may indicate that a sensor is beginning to fail.

Technician locator module 535 can be configured to receive location and schedule updates from mobile devices 210 associated with technicians. Service request module 540 can be configured to identify when the operational status of the equipment monitored by monitoring system 270, e.g., a piping system, is inoperative and/or is about to have an inadvertent operation and identify an available technician using the technician locator. As a technician is servicing the monitored equipment, he or she may use a computer application or a mobile application to report various findings, observations, parts replaced, and the like. As this information is transmitted to monitoring platform 230, recordation module 545 can record the information from the technician in the appropriate corrosion monitoring profile.

Analytics engine 550 can analyze the sensor data from one or more monitoring devices 100 and perform the functions discussed above with respect to edge devices, including corrosion monitoring device 100, LPM device 1100, and/or DPM device 2100. Because these function are discussed above, for brevity, they will not be further discussed. The analytics engine can also generate a correlation model that is predictive of when a failure and/or an inadvertent operation (i.e., false trip) of the fire suppression system is likely, e.g., due to thinning pipe walls, predictive of when freezing of the pipes and/or valves is likely to occur, predictive of some other type of abnormal operating state of the fire suppression system, predictive of when certain maintenance and/or inspection activities should occur, and/or predicts some other type of abnormal operating condition and/or inspection activity. The correlation model (or models) are generated based on one or more of the following: sensor data relating to the electrical characteristic of each the corrosion sensors, e.g., coupon portions 106, relating to the level and/or the rate of corrosion; other sensor data such as water and/or air pressures in the system, the temperature of the pipe and/or valve, and/or ambient temperature outside the pipe and/or valve, and/or the presence or absence of water; and other types of information such as the thickness of the piping wall, the equipment material, and/or observations from the technicians during inspections. Prediction engine 555 can be configured to process the sensor data in real-time against the correlation model or models generated by the analytics engine 550 and generate an alarm condition, an inspection request based on the information gathered from the sensors in the corrosion monitoring system 270, and/or determine the respective measurement intervals for the monitoring devices 100. For example, if the edge device indicate that the possibility of an inadvertent operation (e.g., false trip) of the fire suppression system is low, the time between maintenance inspections and/or measurement intervals can be extended. If the edge devices indicate there is could be a problem, the time between inspections and/or the measurement intervals can be decreased. Analytics engine 550 can monitor the sensor data and generate other types of analytics. In some embodiments, part or all of the functions of analytics engine 550 and/or prediction engine 555 can be incorporated into local processing unit 235 and/or the edge devices.

GUI generation module 560 can generate one or more GUI screens that allow for interaction with a user. In at least one embodiment, GUI generation module 560 can generate a graphical user interface allowing a user to set preferences, review reports, create profiles, set device constraints, and/or otherwise receive or convey information about device customization to the user. For example, GUI generation module 560 can be configured to retrieve, from the database, the information from the multiple corrosion monitoring profiles. Once the information has been retrieved, GUI generation module 560 can generate a graphical user interface allowing a user to see the operational status of any of the profiles of the equipment being monitored, e.g., via mobile device 210 and/or stationary electronic device 215. The information generated by the analytics engine 550 and/or the prediction engine 555 as discussed above are sent to the user and/or are available to the user via the GUI screens.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A fire suppression monitoring system, comprising:
a temperature sensor coupled with at least one of a pipe of a fire suppression system and a valve of the fire suppression system, the temperature sensor to transmit a temperature signal comprising an indication of a temperature of the at least one of the pipe and the valve, the fire suppression system comprising one or more sprinklers coupled with the at least one of the pipe and the valve; and
one or more processors coupled with a memory device and configured to:
retrieve the temperature from the temperature signal to store, in the memory device, a plurality of values, over a period of time, of the temperature of the at least one of the pipe or the valve;
increase a frequency of a rate of transmission, of an output signal representative of the plurality of values, based on one or more criteria, the one or more criteria comprising at least one of type of piping of the fire suppression system, the temperature, and an ambient temperature outside the at least one of the pipe and the valve; and
cause transmission, according to the rate of transmission, over a wireless communication connection between the one or more processors and a remote device, of the output signal as a batch transmission comprising the plurality of values.

2. The fire suppression monitoring system of claim 1, comprising:
the one or more processors are configured to generate the output signal to provide a freeze alert based on the temperature.

3. The fire suppression monitoring system of claim 1, comprising:
the one or more processors are configured to cause a notification of the output signal to be presented, by the remote device, based on a type of the notification indicated by a user profile associated with the remote device.

4. The fire suppression monitoring system of claim 1, comprising:
a device comprising the one or more processors is remote from the temperature sensor.

5. The fire suppression monitoring system of claim 1, comprising:
the temperature sensor is a first temperature sensor; and
the fire suppression monitoring system comprises a second temperature sensor configured to detect an ambient temperature outside the valve and to provide an indication of the ambient temperature to the one or more processors.

6. The fire suppression monitoring system of claim 1, comprising:
at least one of a local processing unit and a gateway device comprising a first processor of the one or more processors, the first processor configured to store, in the memory device, a unique identifier of the at least one of local processing unit and the gateway device to associate the at least one of the local processing unit and the gateway device with the fire suppression monitoring system.

7. The fire suppression monitoring system of claim 1, comprising:
a corrosion sensor configured to detect an indication of corrosion of the pipe; and
the one or more processors are configured to provide an alert to the remote device corresponding to the indication of corrosion.

8. The fire suppression monitoring system of claim 1, comprising:

the one or more processors are configured to determine a maintenance status of the pipe based on sensor data from one or more sensors comprising the temperature sensor.

9. A system, comprising:

one or more processors coupled with a memory device, the one or more processors configured to:

receive a temperature signal from a temperature sensor coupled with at least one of a pipe of a fire suppression system and a valve of the fire suppression system, the temperature signal comprising an indication of a temperature of the at least one of the pipe and the valve, the at least one of the pipe and the valve coupled with one or more sprinklers;

store in the memory device, a plurality of values of the temperature of the at least one of the pipe or the valve;

increase a frequency of transmission, of an output signal representative of the plurality of values, based on one or more criteria, the one or more criteria comprising at least one of type of piping of the fire suppression system, the temperature, and an ambient temperature outside the at least one of the pipe and the valve; and cause transmission, over a wireless communication connection between the one or more processors and a remote device, of the output signal as a batch transmission comprising the plurality of values.

10. The system of claim 9, comprising:

the one or more processors are configured to generate the output signal to provide a freeze alert based on the temperature.

11. The system of claim 9, comprising:

the one or more processors are configured to cause a notification of the output signal to be presented, by the remote device, based on a type of the notification indicated by a user profile associated with the remote device.

12. The system of claim 9, comprising:

at least one of a local processing unit and a gateway device comprising a first processor of the one or more processors, the first processor configured to store, in the memory device, a unique identifier of the at least one of local processing unit and the gateway device.

13. The system of claim 9, comprising:

the one or more processors are configured to determine a maintenance status of the pipe based on sensor data from one or more sensors comprising the temperature sensor.

14. A method, comprising:

receiving, by one or more processors, a temperature signal from a temperature sensor coupled with at least one of a pipe of a fire suppression system and a valve of the fire suppression system, the temperature signal comprising an indication of a temperature of the at least one of the pipe and the valve, the at least one of the pipe and the valve coupled with one or more sprinklers;

storing, in memory, by the one or more processors, a plurality of values of the temperature of the at least one of the pipe or the valve;

increasing, by the one or more processors, a frequency of transmission of an output signal representative of the plurality of values, based on one or more criteria comprising at least one of type of piping of the fire suppression system, the temperature, and an ambient temperature outside the at least one of the pipe and the valve; and causing transmission, by the one or more processors, over a wireless communication connection between the one or more processors and a remote device, of the output signal as a batch transmission comprising the plurality of values.

* * * * *